United States Patent [19]
Sugiura et al.

[11] Patent Number: 5,408,343
[45] Date of Patent: Apr. 18, 1995

[54] IMAGE PROCESSOR IN WHICH COLORS IN AN ORIGINAL COLOR IMAGE ARE IDENTIFIED AS PREDETERMINED PATTERNS ON A MONOCHROMATIC COPY OF THE ORIGINAL

[75] Inventors: Takashi Sugiura, Kawasaki; Shizuo Hasegawa, Tokyo; Hiroyuki Ichikawa, Kawasaki; Hirohiko Tashiro, Yokohama, all of Japan

[73] Assignee: Canon Kabushiki Kaisha, Tokyo, Japan

[21] Appl. No.: 283,142

[22] Filed: Aug. 1, 1994

Related U.S. Application Data

[63] Continuation of Ser. No. 913,039, Jul. 14, 1992, abandoned.

[30] Foreign Application Priority Data

Jul. 19, 1991 [JP] Japan ................................. 3-179151
Jul. 9, 1992 [JP] Japan ................................. 4-182126

[51] Int. Cl.⁶ ............................................. H04N 1/46
[52] U.S. Cl. ..................................... 358/520; 358/518
[58] Field of Search ........................... 358/520–521, 358/529, 534–536, 518, 522

[56] References Cited

U.S. PATENT DOCUMENTS

| | | | |
|---|---|---|---|
| 4,369,461 | 1/1983 | Tamura | 358/75 |
| 4,733,295 | 3/1988 | Hemsky et al. | 358/520 |
| 4,782,384 | 11/1988 | Tucker et al. | 358/518 |
| 4,839,718 | 6/1989 | Hemsky et al. | 358/520 |
| 4,903,145 | 2/1990 | Funada | 358/462 |
| 5,021,876 | 6/1991 | Kurita et al. | 358/75 |

FOREIGN PATENT DOCUMENTS

| | | | |
|---|---|---|---|
| 446008 | 9/1991 | European Pat. Off. | H04N 1/40 |
| 463844 | 1/1992 | European Pat. Off. | H04N 1/46 |
| 3802736 | 8/1988 | Germany | H04N 1/46 |
| 53-18334 | 2/1978 | Japan . | |
| 63-59303 | 6/1981 | Japan . | |

OTHER PUBLICATIONS

IBM Technical Disclosure Bulletin, vol. 31, No. 3, pp. 216–229 (Aug. 1988).

*Primary Examiner*—Stephen Brinich
*Attorney, Agent, or Firm*—Fitzpatrick, Cella, Harper & Scinto

[57] ABSTRACT

An image processing apparatus in which a color identifier identifies the color of an input image based on an input color-image signal. A luminance detector detects luminance information in the input color-image signal. An image generator generates a predetermined pattern which is indicative of the color identified by the color identifier. A measurement device measures the luminance distribution of the detected luminance signal which is outside an area in which color is identified by the color identifier. The output density of the input color-image signal is set in accordance with the measured luminance distribution, and an output monochromatic image is produced in which colors of the input image are identified by the predetermined patterns.

45 Claims, 23 Drawing Sheets

FIG. 12A  RED: 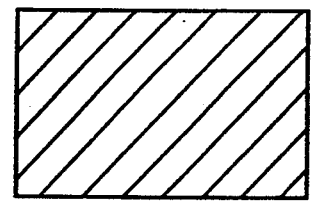
FIG. 12B  YELLOW: 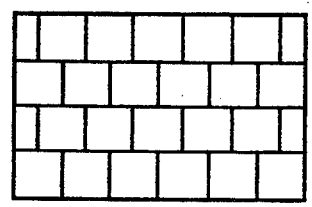
FIG. 12C  BLUE: 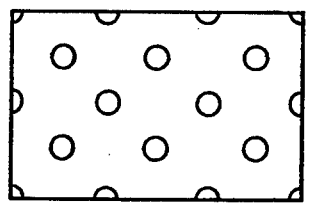
FIG. 12D  GREEN: 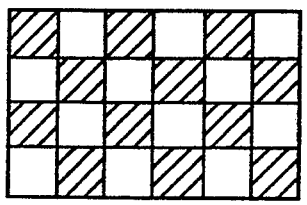
FIG. 12E  BROWN: 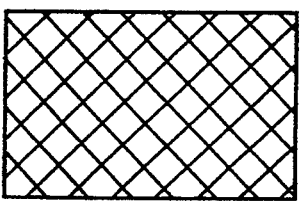
FIG. 12F  ORANGE: 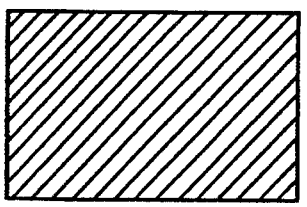

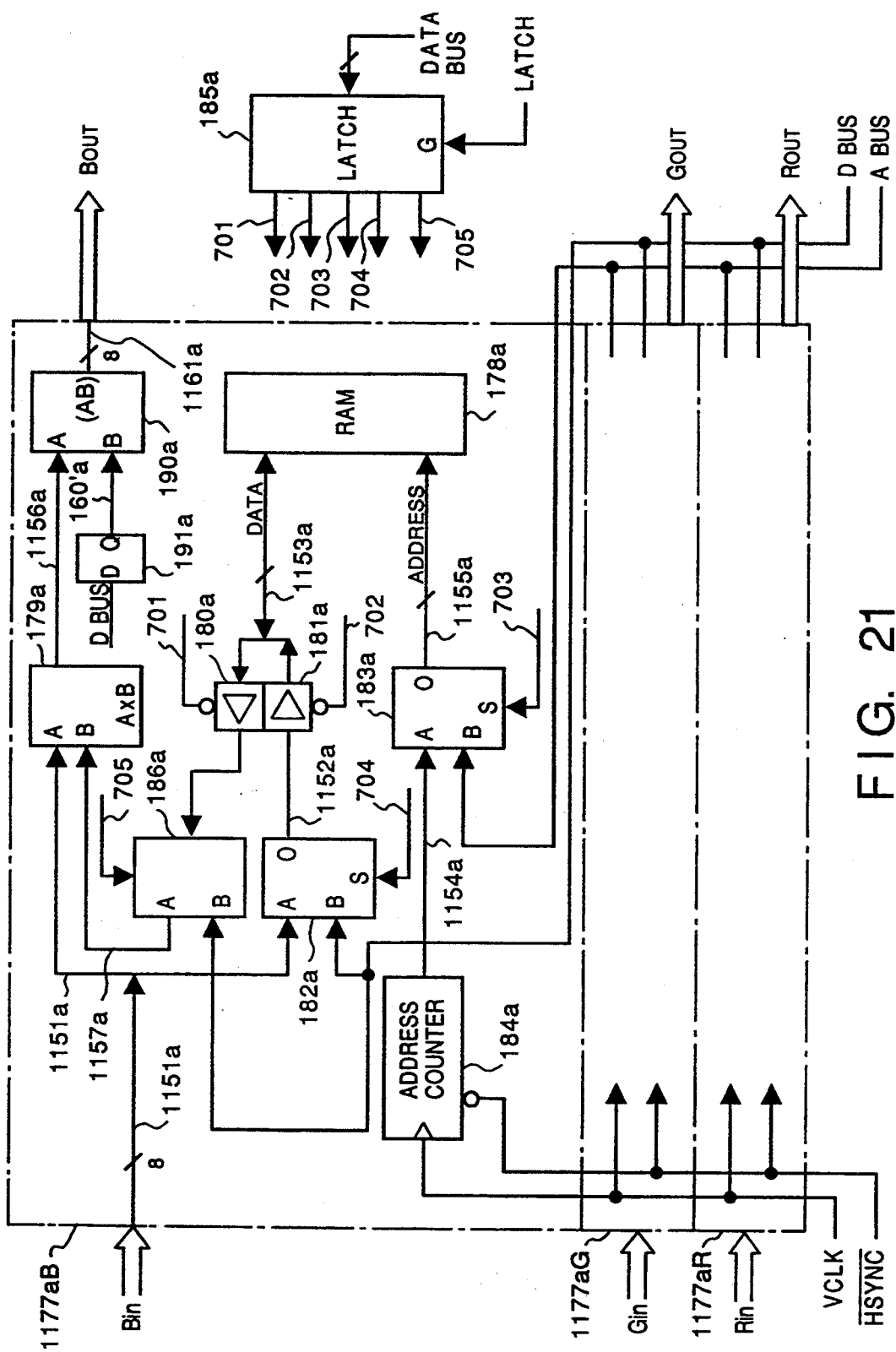
F I G. 21

IMAGE PROCESSOR IN WHICH COLORS IN AN ORIGINAL COLOR IMAGE ARE IDENTIFIED AS PREDETERMINED PATTERNS ON A MONOCHROMATIC COPY OF THE ORIGINAL

This application is a continuation of application Ser. No. 07/913,039 filed Jul. 14, 1992, now abandoned.

BACKGROUND OF THE INVENTION

1. Field of the Invention

This invention relates to an image processing method and apparatus. More particularly, the invention relates to an image processing method and apparatus for reading a color original, for example, and expressing differences in color by a black-and-white output in conformity with the particular color.

2. Description of the Prior Art

A conventional method of expressing a difference in color by a difference in a pattern is described in the specification of Japanese Patent Publication No. 63-59303. According to this disclosure, colors in an original document are identified, patterns corresponding to the identified colors are selected from a memory storing a plurality of patterns, and the patterns are output in a single color. As a result, chromatic portions contained in the image of the original are reproduced in the form of corresponding patterns and all other portions are output in the form of luminance information.

In the example of the prior art described above, however, when the luminance distribution of the entire document is sampled in the usual manner also when AE (automatic exposure) is applied, even areas (chromatic portions) of the document at which luminance information is not output are sampled. As a consequence, AE cannot be performed accurately.

Further, in a case where a document has a background or base color, it is desired that this background-color portion not be converted into a pattern. In the prior art, however, the background-color is replaced by a pattern and printed when it is judged that the background of the document is chromatic.

SUMMARY OF THE INVENTION

The present invention has been conceived in view of the foregoing drawbacks of the prior art and its object is to provide an image processing method and apparatus through which AE can be implemented in an accurate manner.

Another object of the present invention is to provide an image processing method and apparatus through which AE processing can be executed in an accurate manner by sampling the luminance of a document in portions other than those that are chromatic.

Still another object of the present invention is to provide an image processing method and apparatus through which the background-color of a document is prevented from being converted into a pattern.

A further object of the present invention is to provide an image processing method and apparatus through which the background-color of a document is prevented from being converted into a pattern by making the background-color approximate the color white.

According to the present invention, the foregoing objects are attained by providing an image processing apparatus which comprises color identifying means for identifying the color of an input image based upon an input color-image signal, luminance detecting means for detecting luminance information in the input color-image signal, image generating means for generating a predetermined pattern based upon the color identified by the color identifying means, measuring means for measuring the luminance distribution of a luminance signal detected by the luminance detecting means, outside an area in which color has been identified by the color identifying means, and setting means for setting the output density of the input color-image signal in dependence upon the luminance distribution measured by the measuring means.

According to another aspect of the present invention, there is provided an image processing apparatus which comprises color identifying means for discriminating the color of an input image based upon an input color-image signal, luminance detecting means for detecting luminance information in the input color-image signal, measuring means for measuring the luminance distribution detected by the luminance detecting means, image generating means for generating a predetermined pattern based upon the color identified by the color identifying means, inhibiting means for inhibiting generation of the pattern from the image generating means in dependence upon the distribution measured by the measuring means, and pattern synthesizing means for outputting, in the form of a pattern from the image generating means, an area in which color has been identified by the color identifying means, and outputting, in the form of the luminance information in the color image signal, an area other than the area in which color has been identified.

According to the present invention, the foregoing objects are attained by providing an image processing method comprising the steps of inputting a color image signal which represents an image containing color, detecting luminance information in the input color image signal, applying predetermined image processing to the input color image signal, measuring the luminance distribution of the input color image signal, and controlling an area, which is subjected to image processing, in dependence upon the measured luminance distribution.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 12A–12F are diagrams showing the correspondence between colors and patterns;

FIG. 21 is a block diagram showing the construction of a white correcting circuit according to another embodiment;

DESCRIPTION OF THE PREFERRED EMBODIMENTS

Preferred embodiments of the present invention will now be described in detail with reference to the accompanying drawings.

Figure 1:
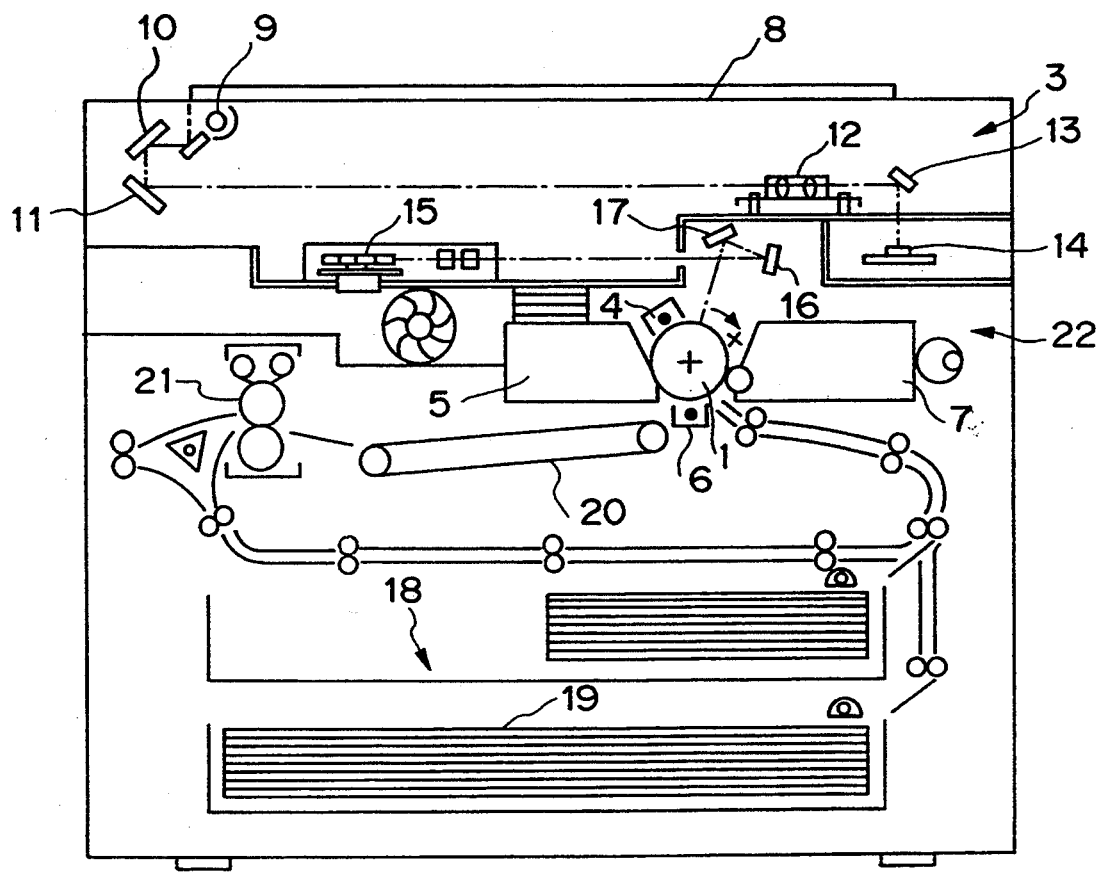
FIG. 1 is a sectional view illustrating the structure of a copying machine in which image processing according to the present invention is used.

FIG. 1 is a sectional view showing a copying machine which employs the image processing apparatus of this embodiment.

The copying machine has a lower section which includes a printer 22, and an upper section which includes an image reader 3. The printer 22 includes a photosensitive drum 1 the surface of which has a photosensitive layer for electrophotography. The drum 1 is rotatively driven in the direction of an arrow X. Disposed about the photosensitive drum 1 are a primary corona discharge device 4, a cleaning unit 5, a corona discharge device 6 and a developer 7.

The image reader 3 reads the image of an original placed upon a glass platen and includes the glass plate 8, a lamp 9 for irradiating the original, scanning mirrors 10 and 11, imaging lenses 12, a three-color separating blazed diffraction grating 13 and a CCD 14. A halogen lamp 9 used for irradiating the original is adapted so as to perform scanning motion together with the scanning mirrors 10 and 11. As a result, the original is scanned in the subordinate scanning direction at a preset fixed speed.

Reflected light from the scanned original passes through the lenses 12 and then is converted into electric signals upon being separated into colors by the three-color separating blazed diffraction grating 13 and CCD 14. The signals obtained by thus reading the original are subjected to various image processing. Thereafter, laser light modulated by the image signal is emitted from a laser scanner unit 15, and the laser light is made to irradiate the photosensitive drum 1 by fixed mirrors 16 and 17 whereby the image is exposed. Numerals 18 and 19 denote copy cassettes in which copy paper is stacked, and numeral 20 denotes a conveyor belt for conveying copy paper, to which an image has been transferred by the corona discharge device 6, and then to a fixer The CCD 14 has a solid-state image pick-up element array (a line sensor) comprising three lines corresponding to each of the colors R, G, B. The spacing between the line sensors corresponding to the three primary colors R, G, B is decided in conformity with the angle of view. Thus, the surface of the original is line-scanned by a mirror (not shown) disposed between the lenses 12 constituting the imaging optical system, the reflected image is separated into a three-color light flux in the color-image reading operation via the lenses 12 by means of the three-color separating blazed diffraction grating 13, and the resulting images are formed on the line sensors corresponding to the colors of the CCD 14.

Figure 2:
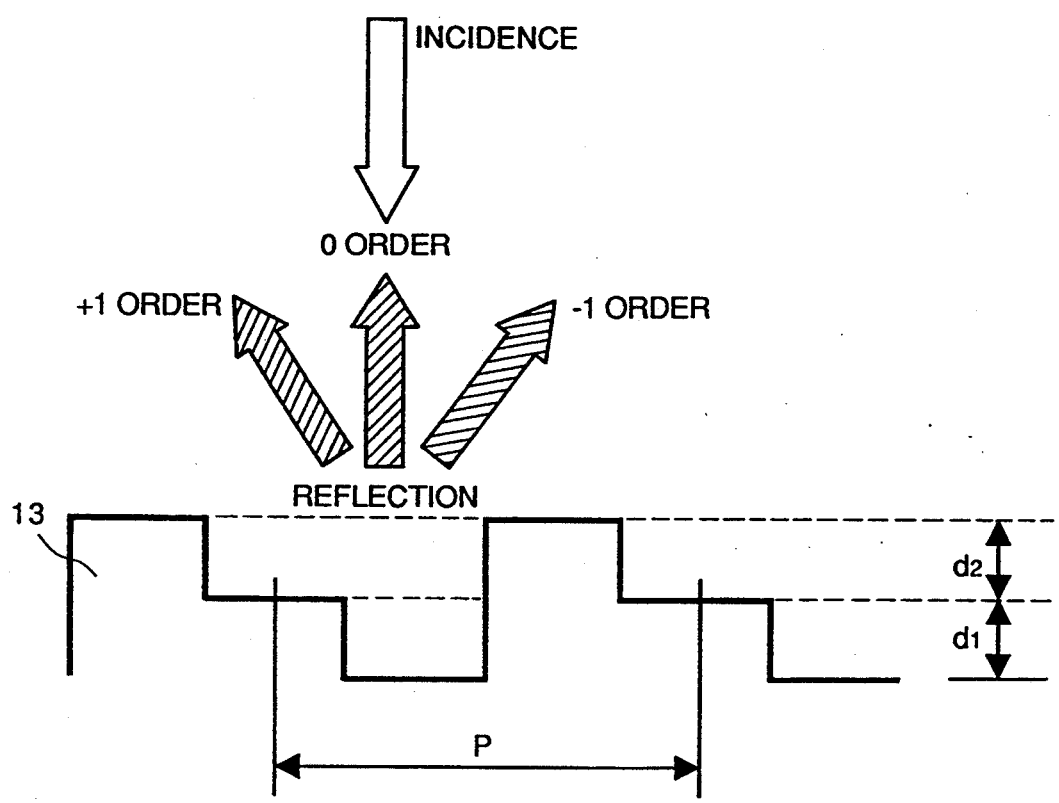
FIG. 2 is a diagram which is useful for describing the diffraction grating of a CCD sensor.

The general features of the three-color separating one-dimensional blazed diffraction grating 13 will now be described with reference to FIG. 2. The three-color separating one-dimensional blazed diffraction grating 13 is so structured that a step-shaped grating repeats periodically in each color-separating direction. For example, if the pitch P of the period is 60 $\mu$m, the grating thickness is $d_1 = d_2 = 3100$ $\mu$m and the refractive index of the medium is 1.5, then the incident light is transmitted and diffracted and separated into three directions, as shown in FIG. 2.

Figure 3:
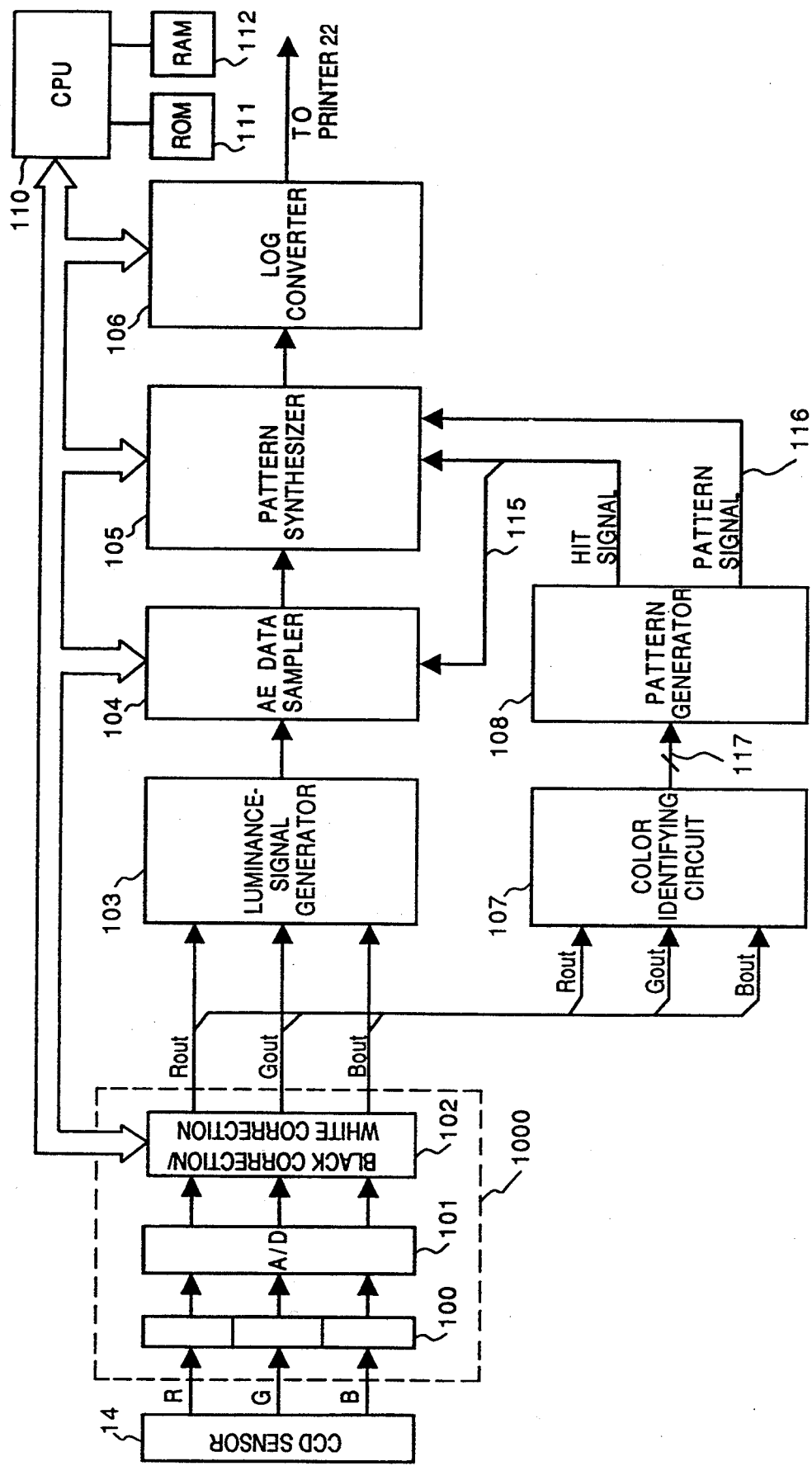
FIG. 3 is a block diagram illustrating the construction of an image processing circuit according to a first embodiment.

FIG. 3 is a block diagram showing the overall construction of the image processor in a digital copying machine according to this embodiment.

In FIG. 3, numeral 100 denotes an amplifier circuit for amplifying the output signal from the CCD image sensor 14 to obtain a signal of a prescribed amplitude. An A/D converter 101 converts the amplified image signal into a digital signal, and a black-correcting/white-correcting circuit 102 subjects the digital image signal to a black-level correction and a white-level correction (shading correction), described below. The amplifier circuit 100, A/D converter 101 and black-correcting/white-correcting circuit 102 are contained in an input image processing section 1000. A luminance-signal generating unit 103 generates a luminance signal from the digital image signals ($R_{OUT}$, $G_{OUT}$, $B_{OUT}$) that have undergone the black correction and white correction. An AE data sampler unit 104 samples and stores luminance information when automatic exposure is carried out. Luminance information stored in unit 104 is sampled by a CPU 110 to measure the luminance of the original. A pattern synthesizer circuit 105 combines the luminance signal sampled by the AE data sampler unit 104 and a pattern signal 116, which is output by a pattern generator circuit 108, indicating the particular color. A LOG converter 106 converts the signal output by the pattern synthesizer circuit 105 into a luminance signal and delivers the luminance signal to the printer 22. A color identifying circuit 107 identifies the color of each pixel of the digital color image signal that has undergone the black correction and white correction and delivers an identification signal 117 to the pattern generator circuit 108. The latter receives the identification signal 117 as an input and outputs the pattern signal 116, which is decided in conformity with each color, and also outputs a HIT signal 115. Numeral 110 denotes a CPU for controlling the overall apparatus, numeral 111 denotes a ROM for storing programs for operating the CPU 110 as well as various data, and numeral 112 denotes a RAM which is used as a work area when the CPU 110 executes control processing.

The copying operation performed by the copying machine having the foregoing construction will now be described. It is assumed here that the copying machine is a monochromatic copying machine in which the image of a color original is read and patterns corresponding to the colors of the original are printed, whereby the colors of the image of the original can be identified even though the printed image is monochromatic.

Figure 4:
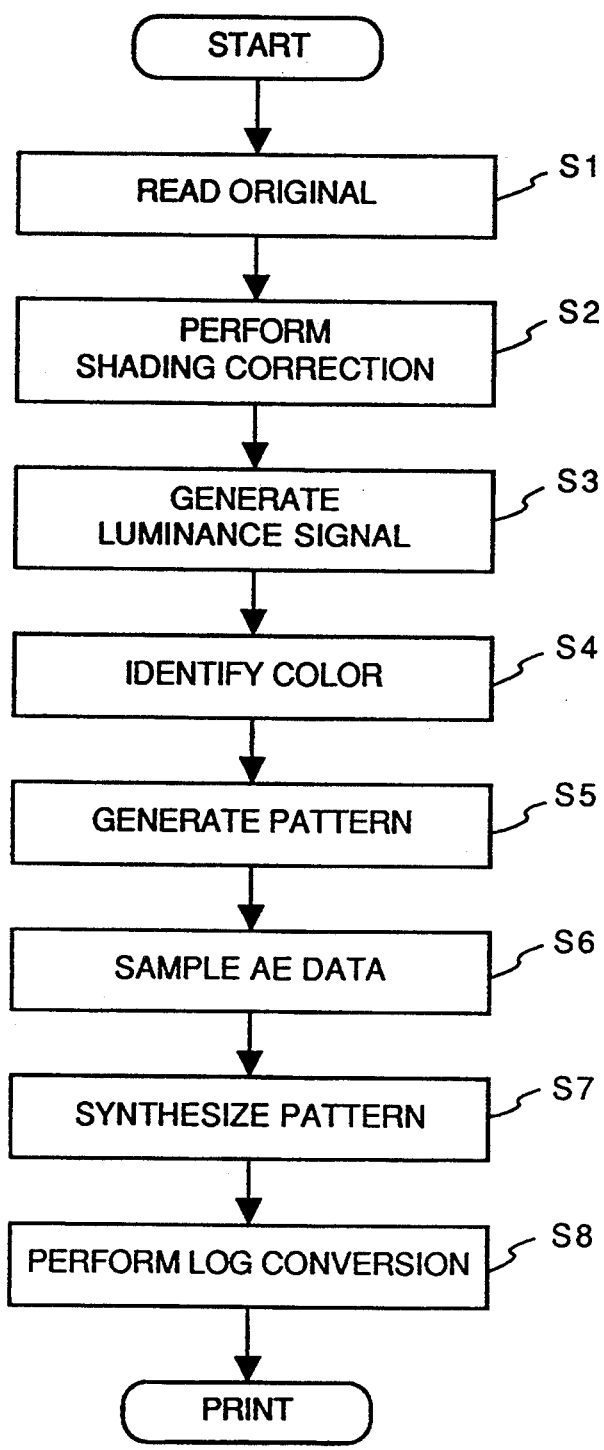
FIG. 4 is a flowchart for describing an image processing procedure in an image processing circuit according to this embodiment.

FIG. 4 is a flowchart illustrating the copying operation performed by the copying machine of this embodiment.

The image reader 3 reads a color original by causing the original to be scanned by the CCD sensor 14, which comprises the three lines R (red), G (green) and B (blue), and converts the read color image signals into analog electric signals (step S1). The analog image signals are amplified by the amplifier 100, after which they are sampled and held, subjected to a gray-level correction, adjusted in dynamic range and then A/D-converted into digital R, G, B signals by the A/D converter 101. The image signals thus converted into digital signals are subjected to a shading correction (step S2) by the black-correcting/white-correcting circuit 102 in dependence upon the light-receiving sensitivity of the CCD sensor 14.

Figure 5:
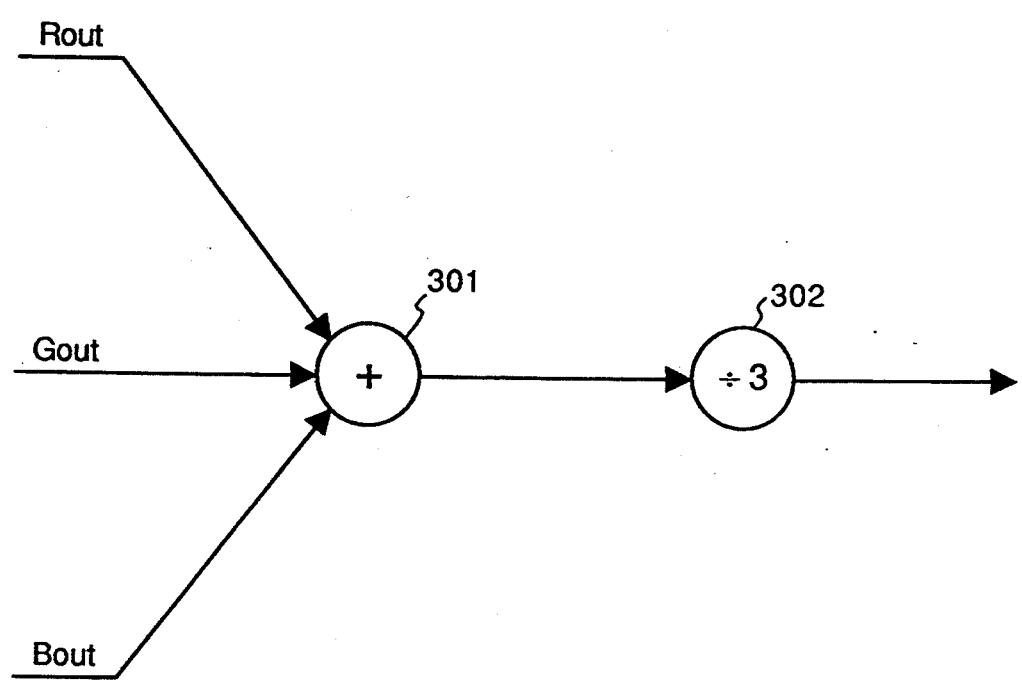
FIG. 5 is a block diagram showing the construction of a luminance-signal generator according to this embodiment.

The digital image signals thus corrected (i.e., signals $R_{OUT}$, $G_{OUT}$, $B_{OUT}$) enter the luminance-signal generating unit 103, where they are converted into a luminance signal (step S3). As for the method of making the conversion to a luminance signal, the operation $(R_{OUT}+G_{OUT}+B_{OUT})\times \frac{1}{3}$ is performed to produce the luminance signal, as shown in FIG. 5. In FIG. 5, numeral 301 denotes an adder for adding the color signals $R_{OUT}$, $G_{OUT}$, $B_{OUT}$, and numeral 302 denotes a divider for dividing the sum from the adder 301 by 3 to obtain an average value of the three color signals. The luminance information thus produced is sent to the pattern synthesizer 105 via the AE data sampler unit 104. In a case where an ordinary copying operation is performed, the luminance information is converted into a density signal, which corresponds to the output density of the printer 22, by the LOG converter 106 via the AE data sampler unit 104 and pattern synthesizer circuit 105, and an image is output by the printer 22. The details of this operation will be described later.

Meanwhile, the signals $R_{OUT}$, $G_{OUT}$, $B_{OUT}$ corrected by the black-correcting/white-correcting unit 102 are sent to the color identifying circuit 107. The latter judges the color area and type of color of each pixel of the image of the original and sends the pattern generating circuit 108 the identification signal 117, which is the result of the judgment (step S4). The pattern generating circuit 108 is constituted by memories such as a RAM and ROM and, in addition to the pattern signal 116 which conforms to the type of color of the identification signal 117, outputs the HIT signal 115, which is indicative of an area in which a color pattern conversion is performed. The HIT signal 115 is sent to the AE data sampling unit 104 (step S5). As a result, when the AE data sampling unit 104 samples the luminance information, the luminance information in an area other than that in which the HIT signal 115 is output, namely the luminance information outside an area in which the color pattern conversion is performed, is sampled. Thus, the arrangement is such that in the case of automatic exposure (AE), sampling is not performed in an area in which the sampling of luminance information is not required, i.e., in an area in which a pattern is output but luminance information is not output (step S6).

The HIT signal 115 and the pattern signal 116 output by the pattern generating circuit 108 are applied to the pattern synthesizing circuit 105, in which the luminance information and pattern signal 116 are combined and the chromatic portion of the original is changed into a pattern (step S7). More specifically, an image signal is synthesized in such a manner that the pattern signal 116 is output for an image area in which the HIT signal 115 is output (namely a color area for which a corresponding pattern exists) and the luminance information is output for an area in which the HIT signal 115 is not output (namely a color area for which a corresponding pattern does not exist) is converted from luminance to density by the LOG converter 106 and is then sent to the printer 22 (step S8), as described earlier.

Each component used in executing the image processing of this embodiment shown in FIG. 3 will now be described in succession.

[Black-correcting/White-correcting Circuit]

Figure 6:
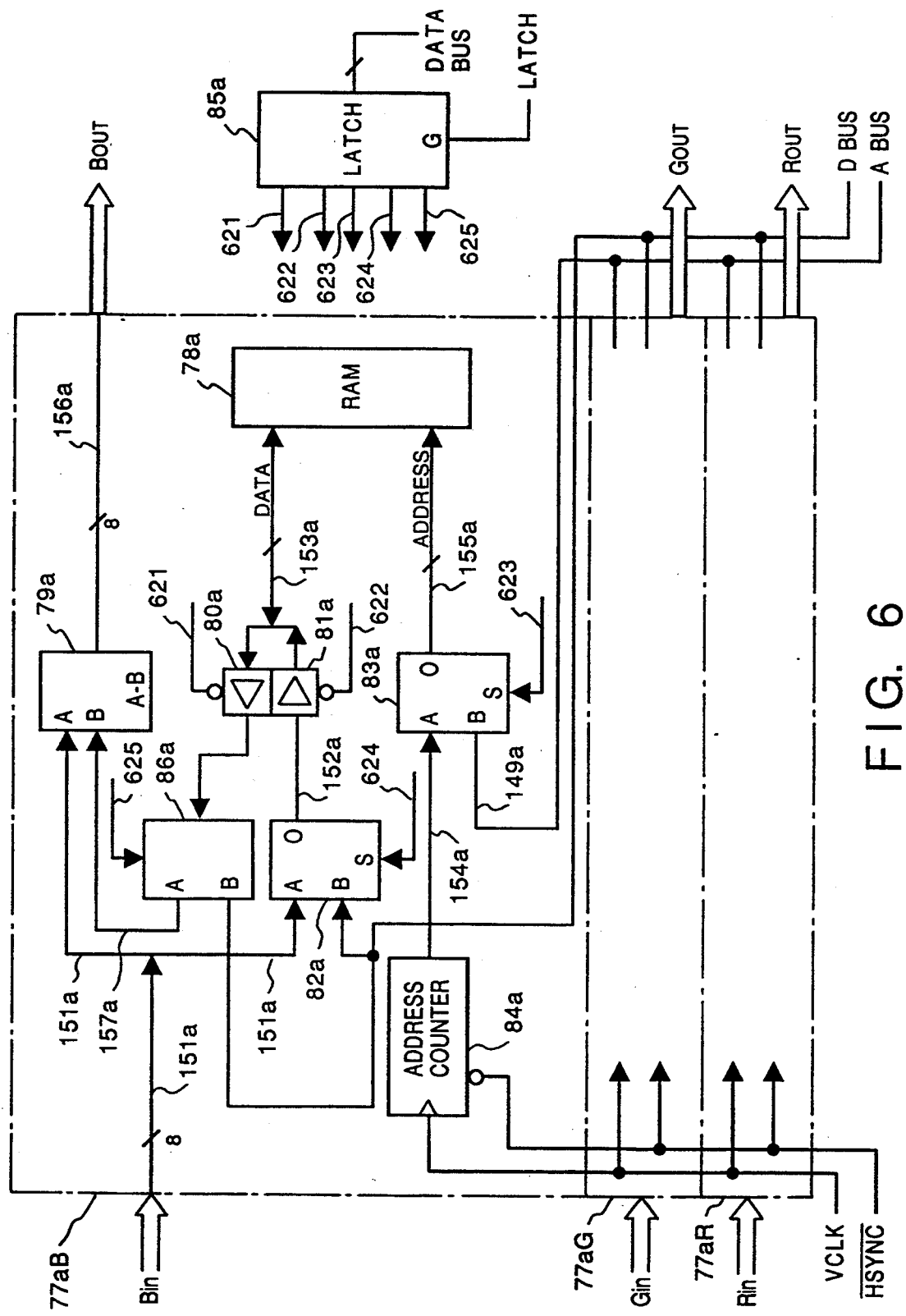
FIG. 6 is a block diagram showing the construction of a black correcting circuit of this embodiment.

FIG. 6 is a diagram showing the construction of a black correcting circuit in the black-correcting/white-correcting circuit 102 of this embodiment.

The digital color image signal obtained from the CCD image sensor 14 upon being A/D-converted exhibits a large disparity between pixels when the quantity of light which enters the CCD image sensor 14 is very small. If this signal were to be output as in the form of an image, streaks or irregularities would develop in the digital image signals. This makes it necessary to correct for the disparities in the output of the black portion. The correction is made by a circuit of the kind shown in FIG. 6.

Before the reading of the original, the original scanning unit in the image reader 3 is moved up to a black-color board, which possesses average density, disposed in a non-image area at the leading edge of the glass plate 8. The lamp 9 is then turned on and an image signal indicative of the black level is input to the black correcting circuit. With regard to a circuit 77aB relating to a blue signal $B_{IN}$, the A input of a selector 82a is selected, a gate 80a is closed and a gate 81a is opened in order to store one line of the image data in a black-level RAM 78a. More specifically, the data line is connected in the manner 151a→152a→153a. Meanwhile, a signal 623 applied to a selector 83a is produced in order that an output 154a of an address counter 84a, which is initialized by HSYNC and clock signal VCLK, will be applied to an address input 155a of the RAM 78a. As a result, one line of the black-level signal is stored in the RAM 78a. (The foregoing mode of operation is referred to as a black reference-value reading mode.)

Thus, when an image is actually read in, the RAM 78a assumes a data read-out mode and the black reference value of the RAM 78a is read out and input to the B input of a subtractor 79a for every line and every pixel via a path composed of data lines 153a→157a. That is, the gate 81a is closed and the gate 80a is open at this time. In addition, a selector 86a delivers an A output. Accordingly, an output 156a from the black correcting circuit is obtained as $B_{IN}(i) - DK(i) = -B_{OUT}(i)$ with respect to black-level data DK(i) in case of, say, a blue signal (this mode is referred to as the black correction mode). Similarly, green $G_{IN}$ and red $R_{IN}$ are controlled by 77aG and 77aR, respectively.

In order to execute control, control lines 621–625 of each selector gate are placed under the control of the CPU 110 (FIG. 3) by a latch 85a which is assigned as the I/O of the CPU 110. By selecting the B inputs of the selectors 82a, 83a and the B output of the selector 86a, the RAM 78a can be accessed by the CPU 110.

Figure 7:
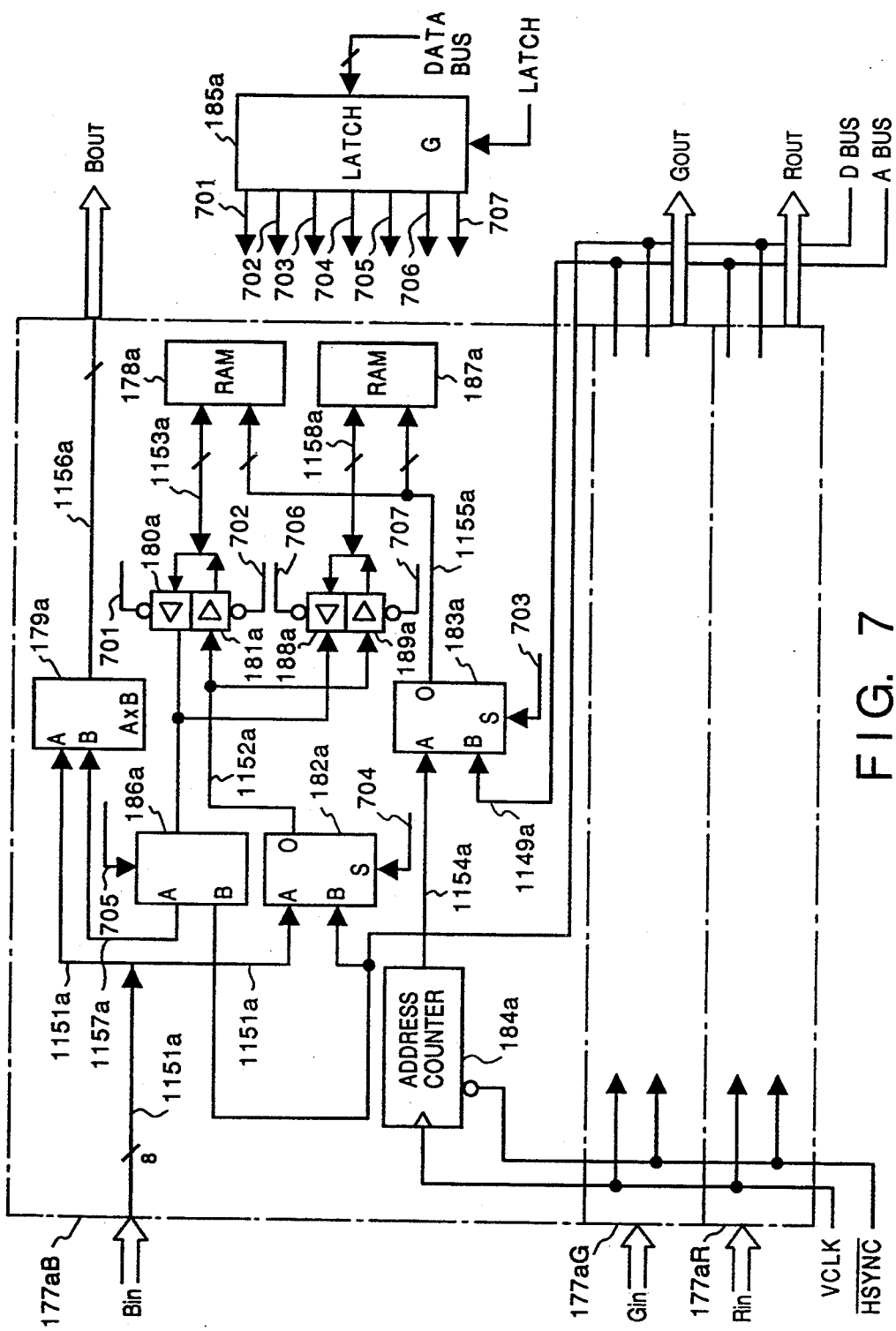
FIG. 7 is a block diagram showing the construction of a white correcting circuit of this embodiment.

FIG. 7 is a block diagram showing the construction of the white correcting circuit in the black-correcting/-white correcting circuit 102 according to this embodiment.

When the CCD 14 for reading the original is at the reading position (home position) of a uniform white board at the time of a color correction (i.e., prior to a copying operation or reading operation), the exposure lamp 9 is turned on, the A input is selected by a selector 182a, a gate 180a is closed and a gate 181a is opened in order to store pixel data of a uniform white level in a correcting RAM 178a for one line. Thus, the data line is connected in the manner 1151a→1152a→1153a. Meanwhile, an A input to a selector 183a is produced in order that an output 1154a of an address counter 184a, which is initialized by HSYNC and clock VCLK, will be applied to an address input 1155a of the RAM 178a. As a result, one line of the white-level signal (white reference value) is stored in the RAM 178a. If the main scanning direction has the length of an A4 sheet of paper longitudinally, then the capacity of the RAM 178a that will be required is 4752 ($=16 \times 297$ mm) pixels ($W_0 \sim W_{4751}$) at 16 pel/mm, i.e., at least 4752 bytes.

Next, in a mode (hereinafter referred to as the ordinary mode) other than the pattern substituting mode, in which a color area of a read image is substituted by a pattern, the image data is eight bits with regard to a read value $D_i$ of an i-th pixel corresponding to $W_i$. Therefore, data $D_0$ following a correction should become $D_0 = D_i \times FFH/W_i$ using the shading correction coefficient $P_0 = FFH$ (where H represents a hexadecimal number).

When the pattern substituting mode is in effect, the corrected data $D_0'$ with respect to the read value $D_i$ of an i-th pixel corresponding to $W_i$ should be as follows, where the shading correction coefficient is $P_1$:

$$D_0' = x \qquad 0 \leq x \leq FFH$$
$$= FFH \qquad x > FFH$$
$$x = D_i \times P/W_i \qquad x \geq 0$$
$$\text{where } P_i > FFH$$

With regard to the correction coefficient $P_1$, this is obtained by scanning and reading the original image in advance, as described in the explanation of the AE data sampling unit 104, set forth below. Further, with regard to the data sampling operation and a histogram of the sampled data, the background level of the image is "DOH", as will be described later with reference to FIGS. 17–19, and therefore the above-mentioned correction coefficient $P_1$ is as follows:

$$P_1 = (FFH/DOH) \times FFH$$
$$= 138H$$

In other words, if the background level is represented by $B0_H$, them $$P_1 = (FFH/B0_H) \times FFH$$

Figure 19:
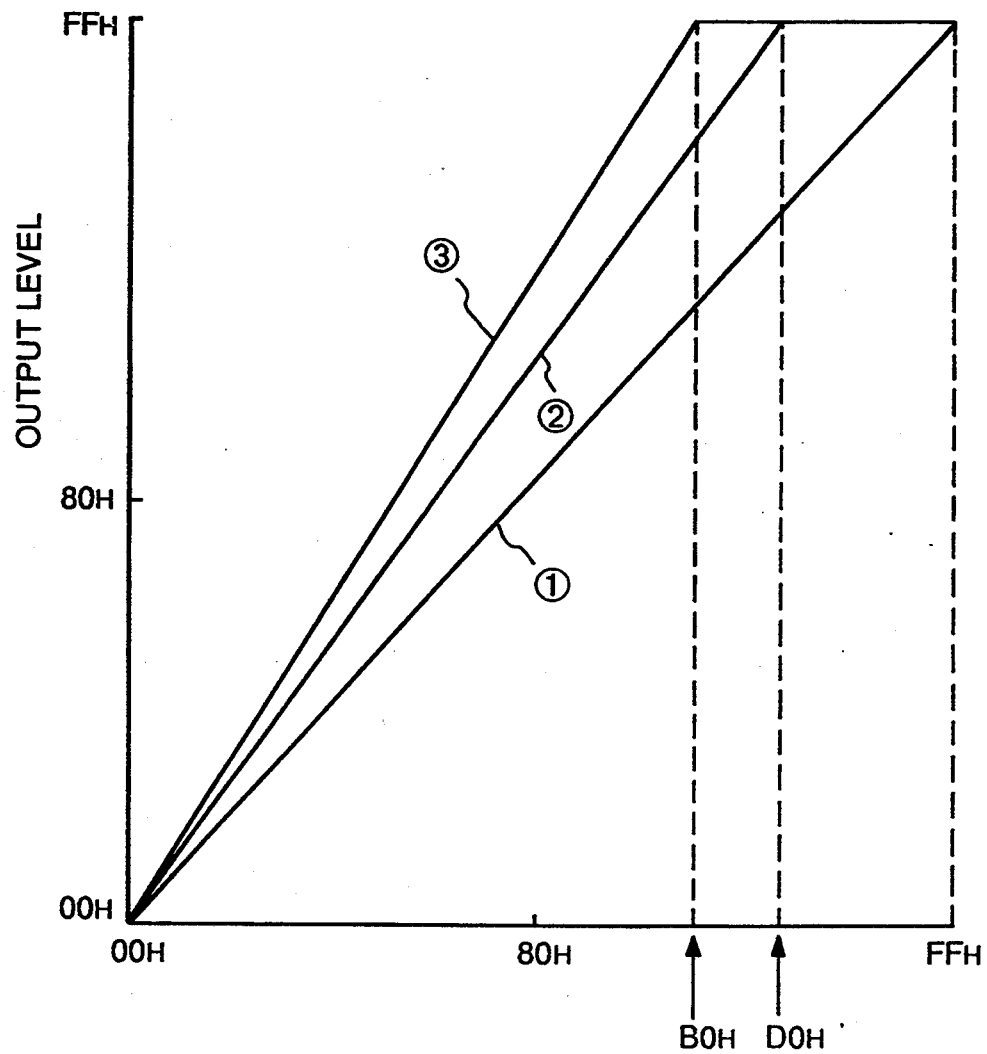
FIG. 19 is a graph showing an example of the data in a background-color correcting table.

The correction table value is as shown at ③ in FIG. 19, and the output level is "FFH" at the input level "BOH". As a result, the background of the image fades.

Accordingly, signals 701–705 from latch 185a are set by the CPU 110 so as to open gates 180a, 181a and select the B input of selectors 182a, 183a and the B output of selector 186a, and the RAM 178a is made accessible by the CPU 110. Next, the CPU 110 successively performs the operations $FFH/W_0$, $P_1/W_0$ with respect to the leading pixel $W_0$ of the data in RAM 178a, performs the operations $FFH/W_i$, $P_1/W_i$ . . . with respect to $W_i$, stores the correction value for the ordinary mode in RAM 178a and stores the correction value for the pattern substituting mode in the RAM 187a. To this end, when the data for the ordinary mode is stored, the B input of selector 183 is selected, gate 181a is opened, gates 189a, 180a, 188a are closed and the correction value is written in RAM 178a. On the other hand, in order to store the data for the pattern substituting mode, it will suffice to close gates 181a, 180a, 188a, open gate 189a and write the correction value in RAM 187a. When the processing for the blue component of the color-component image thus ends, writing is performed in similar fashion in the RAMs corresponding to the circuits 177aG, 177aR of the green and red components, respectively.

Next, operation in the case of the ordinary mode (in which pattern substitution is not carried out) will be described. Gate 180a is opened, gates 188a, 181a, 189a are closed and data FFH/Wi is read out of the RAM 178a. As a result, the data enters a multiplier 179a through 1153a→1157a so that this data is multiplied by the original image data 1151a input to the other terminal of the multiplier 179a. The output of the multiplier 179a is the product.

On the other hand, when the pattern substituting mode is in effect, the gates 180a, 181a, 189a are closed and the gate 188a is opened, whereby data $P_1/W_i$ is read out of the RAM 187a and input to the multiplier 179a through 1158a→1157a so that this is multiplied by the original image data 1151a input from the other terminal. The output of the multiplier 179a is the product. Here it is assumed that the multiplier 179a is so designed that its output will be FFH if the result of calculation exceeds FFH. Control for changing over the gates can be performed by the CPU 110 before reading of the original, owing to the fact that it is known whether processing applied to this original will carry out pattern substitution or not.

[Description of AE Data Sampling Unit 104]

The AE data sampling unit 104 will now be described.

Figure 8:
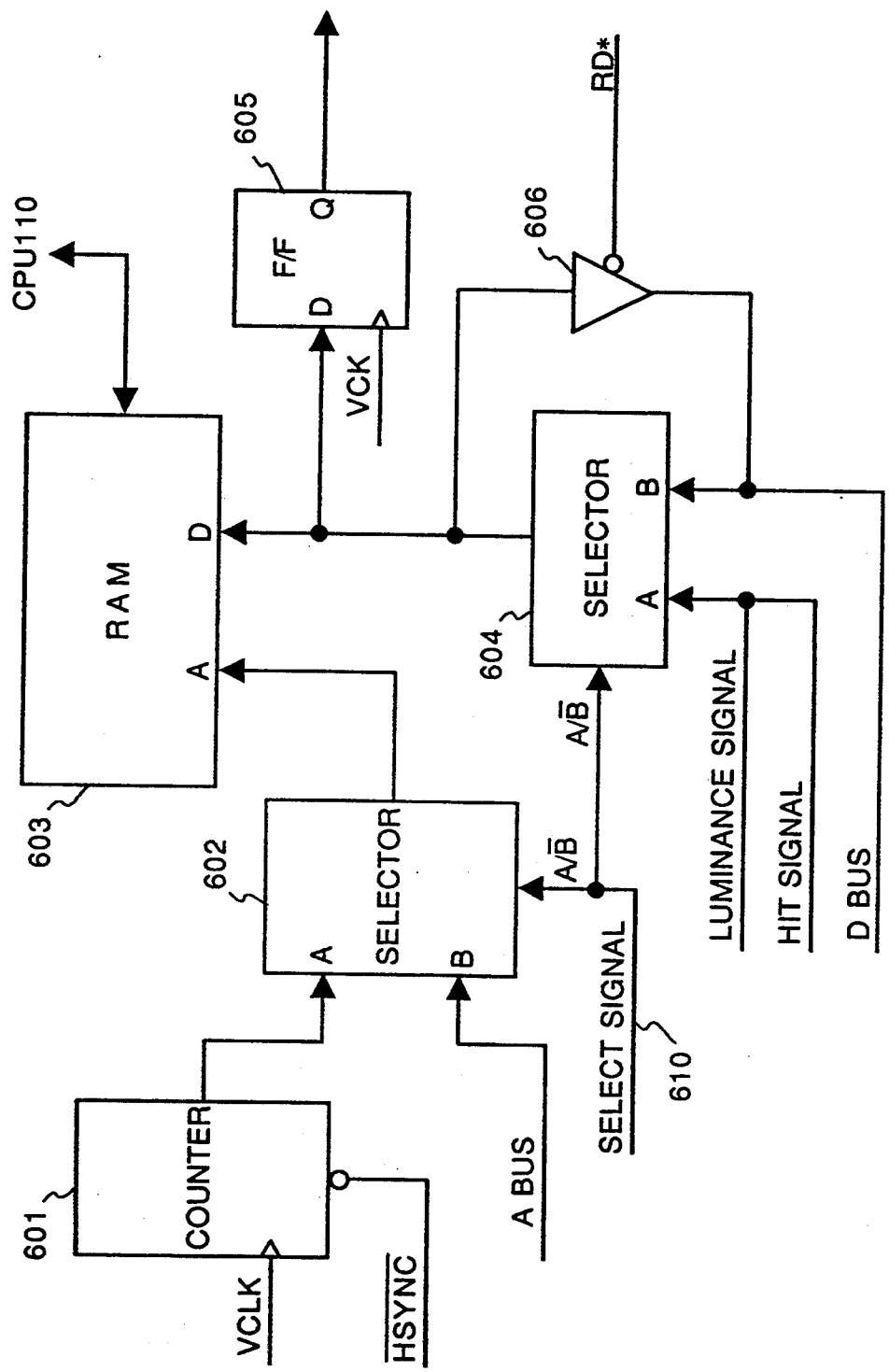
FIG. 8 is a block diagram showing the construction of an AE data sampling unit of this embodiment.

FIG. 8 is a block diagram showing the construction of the AE data sampling unit 104 according to this embodiment. Shown in FIG. 8 are a counter 601, selectors 602 and 604, a RAM 603, a flip-flop 605, and a buffer 606. The counter 601 generates an address when luminance information is stored in the RAM 603. When the selector signal 601 is "1", the selector 602 selects the address from the counter 601 and outputs the address to the RAM 603 so that the luminance information selected by the selector 604 is stored in the RAM 603. At this time, the luminance signal in which the HIT signal is set to the MSB is selected. Thus, the luminance information is stored in the RAM 603. In other words, the luminance information is sampled. Since the luminance signal and the HIT signal whose delay relationship has been adjusted are stored in the MSB of the data in RAM 603, it can be judged whether this data is luminance information of an area judged to have color.

Next, when the CPU 110 reads the data in RAM 603, a select signal 610 is made "0" and the address data from the CPU 110 is input to the RAM 603. When the CPU 110 performs the reading operation, the gate of buffer 606 is opened and the data in RAM 603 is read. When the luminance information is output to the pattern synthesizing circuit 105, the selection signal 610 is made "1" the luminance signal is output by the selector 604 and is delivered to the pattern synthesizer circuit 105 via the flip-flop 605. The clock of the flip-flop 605 is VCK (a video-transfer clock), and the clock of the counter 601 also is VCK.

More specifically, the luminance signal stored temporarily in the RAM 603 of the AE data sampling unit 104 is read by the CPU 110. Since the data in which the MSB of the read data is "1" is within an area judged to have color, this data is discarded and AE data is created merely by the luminance signal outside the area judged to have color.

The color identifying circuit 107 will now be described. In this embodiment, a hue signal is used in the color identifying method. The reason for this is that accurate judgments can be made even in a case where color is the same but vividness and brightness differ. The general features of the color detecting method in the color identifying circuit 107 will be described first.

Figure 9:
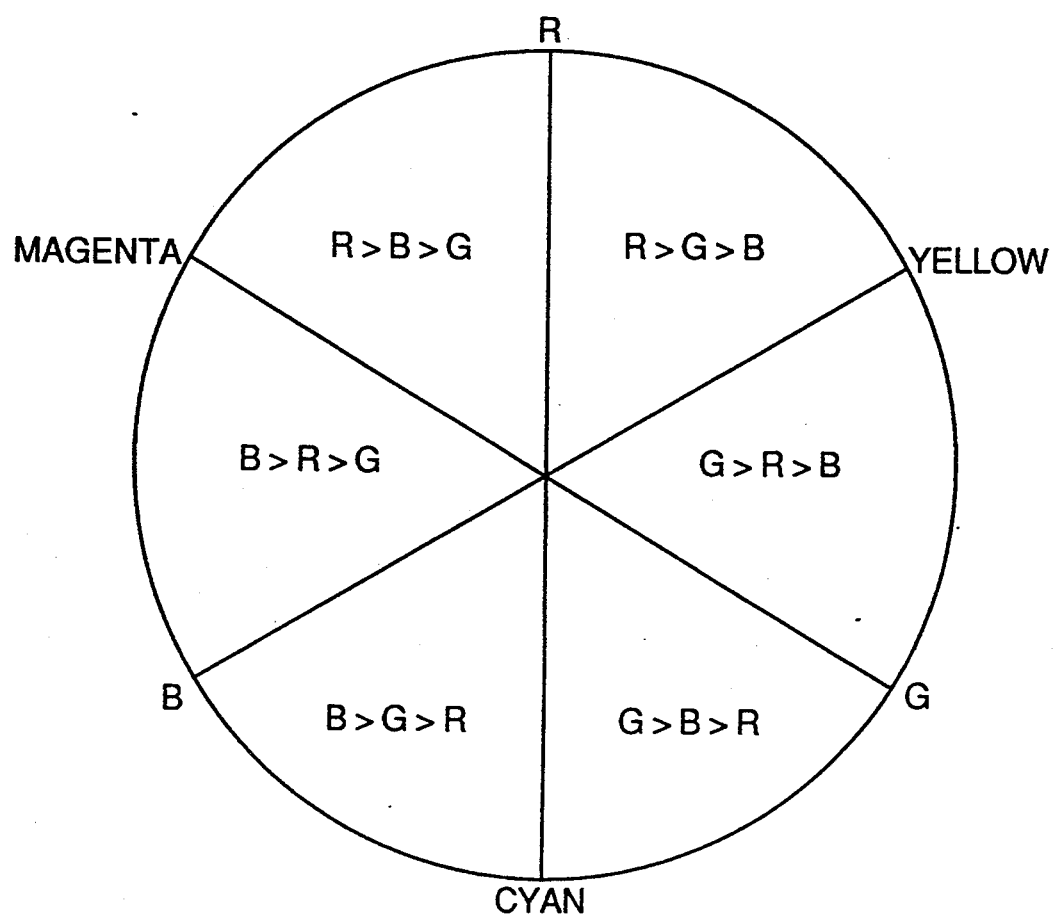
FIG. 9 is a graph which is useful for describing a color plane in a hue conversion.

FIG. 9 is a diagram for describing a color plane in a hue conversion.

The input items of R, G, B data each consist of eight bits and therefore possess information indicative of a total of $2^{24}$ colors. Consequently, using such a massive amount of information as is would involve extremely high cost in terms of the scale of the circuitry.

In this embodiment, the above-mentioned hues are used. Strictly speaking, these hues differ from those expressed ordinarily but shall be referred to as hues here just the same. It is known that color space is expressed by saturation, luminosity and hue, as is known in a Munsell color solid or the like. It is necessary that R, G, B data first be converted into a plane, i.e., two-dimensional data. Since the portions that R, G, B have in common, namely the minimum values min (R,G,B) of R, G, B are achromatic components, min(R,G,B) is subtracted from each of the R, G, B data and the remaining information is used as the chromatic components, whereby the three-dimensional input color space is converted into two-dimensional color space. As shown in FIG. 9, the plane resulting from the conversion is divided into six portions from 0° to 360°, and the hue values are obtained using a LUT (look-up table) or the like in accordance with the order of magnitude of the input R, G, B, namely the information $R>G>B$, $R>B>G$, $G>B>R$, $G>R>B$, $B>G>R$, $B>R>G$, and the maximum values and intermediate values among the input R, G, B.

The construction of the color identifying circuit 107 will now be described.

Figure 10:
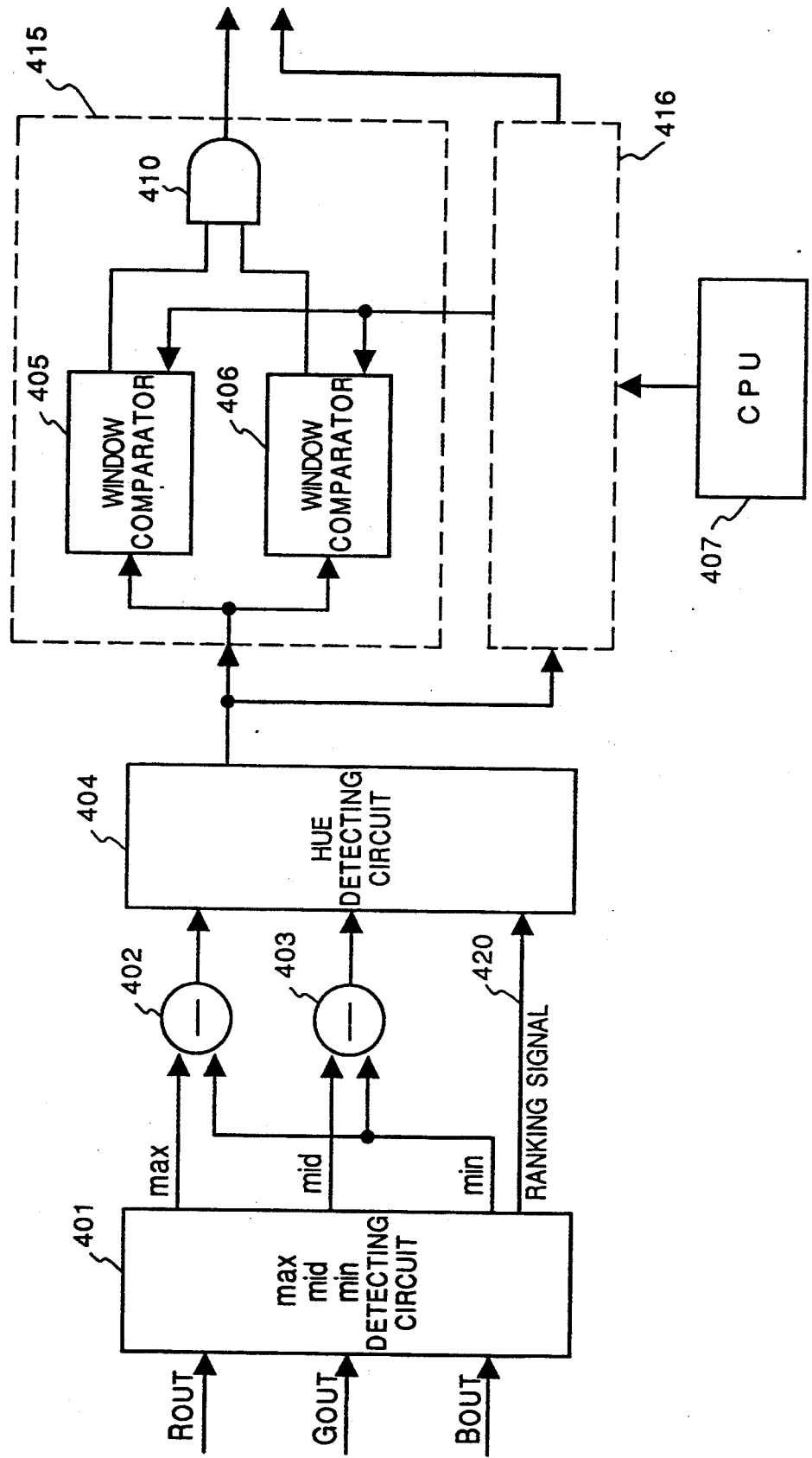
FIG. 10 is a block diagram showing the construction of a color identifying circuit in this embodiment.

FIG. 10 is a block diagram showing the construction of the color identifying circuit 107 according to this embodiment.

Shown in FIG. 10 are a max-mid-min detecting circuit 401, subtractors 402 and 403, a hue detecting circuit 404, color judging circuits 415 and 416, window comparators 405 and 406, an AND gate 410, and a CPU 407. The color judging circuits 415 and 416 are identical in construction.

The operation of the color identifying circuit 107 will be described next.

The input items of $R_{OUT}$, $G_{OUT}$, $B_{OUT}$ data are provided to the max-mid-min detecting circuit 401, which discriminates the magnitudes of these items of data. The detecting circuit 401 compares these items of input data using a comparator and outputs a max (maximum) value, mid (middle) value and min (minimum) value in dependence upon the results of processing. Each output value of the comparator is delivered as a ranking signal 420. Since the achromatic components are subtracted from the max value and mid value, as described above, the min value, which is the smallest, is subtracted from the max value and mid value by the subtractors 402 and 403, respectively, and the difference signals that result are applied to a hue detecting circuit 404 along with the ranking signal 420. The hue detecting circuit 404 is a memory element which is randomly accessible, such as a RAM or ROM. In this embodiment, the detecting circuit 404 constructs a look-up table using a ROM. Values corresponding to the angle of the plane of the kind shown in FIG. 9 are stored in the ROM in advance. Hue values are output depending upon the input ranking signal (max−min) value and the (mid−min) value. The output hue value is input to the window comparators 405 and 406. Values that have been set in the window comparator 405 and 406 are such that when a hue value of color data originally desired to be converted into a pattern is input by data input means (not shown), the hue data value is set by a CPU 407 as an offset value with respect to this hue value. If the value set in the comparator 405 is a1, the comparator 405 will output "1" when (hue data)<a1 holds with regard to the hue data input from the hue detecting circuit 404. If the value set in the comparator 406 is a2 (a1>a2), the comparator 406 will output "1" when (hue data)>a2 holds. As a result, the AND gate 410 outputs "1" when a1>(hue data)>a2 holds, and this serves as the output of the color judging circuit 415.

By virtue of an operation similar to that performed by the color judging circuit 415, a color different from that judged by the color judging circuit 416 is judged by the color judging circuit 416. In this embodiment, the arrangement is such that two types of colors are judged. However, the invention does not limit the types of colors to two; three or more can be judged.

[Pattern Generating Circuit]

The pattern generating circuit 108 will now be described.

Figure 11:
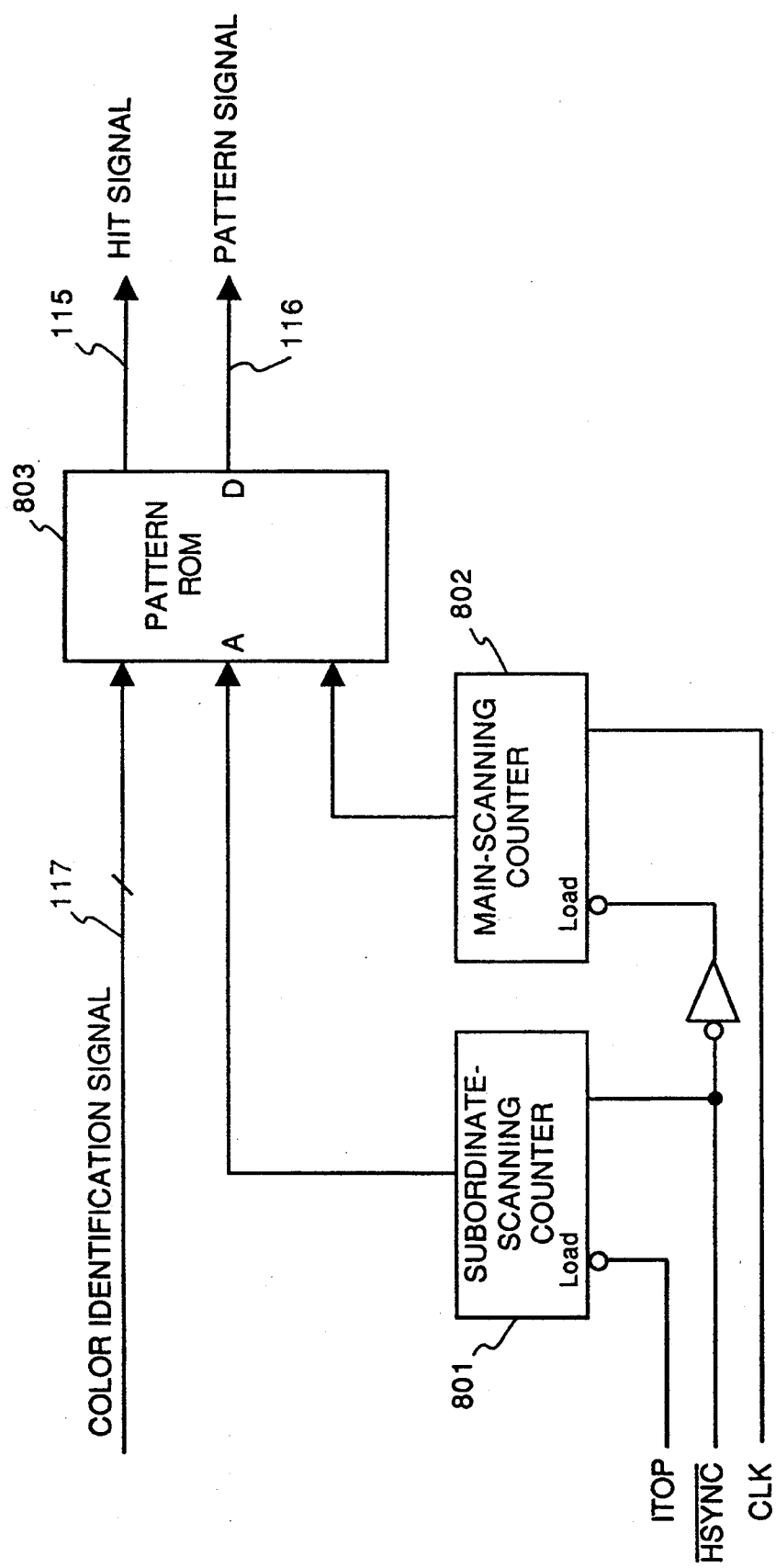
FIG. 11 is a block diagram showing the construction of a pattern generating circuit in this embodiment.

FIG. 11 is a block diagram showing the construction of the pattern generating circuit 108 according to this embodiment, and FIGS. 12A–12F are diagrams showing the correlation between the colors of the image of an original and output patterns.

In FIG. 11, numeral 801 denotes a subordinate-scanning counter, numeral 802 denotes a main-scanning counter and numeral 803 denotes a ROM for storing patterns. Dot patterns corresponding to the colors of the kinds shown in FIGS. 12A–12F are written in the pattern ROM 803 in advance. As shown in FIGS. 12A–12F, the pattern of each figure consists of pattern data of 16×16 dots. The pattern ROM 803 generates patterns by repeatedly outputting patterns corresponding to the color identification signal 117 in accordance with the signals from the main-scanning counter 802 and subordinate-scanning counter 801. The main-scanning counter 802 is loaded to an initial value by a horizontal synchronizing signal HSYNC and counts a video clock CLK so as to generate addresses in the main-scanning direction. The subordinate-scanning counter 801 is loaded to an initial value by an ITOP signal and counts the horizontal synchronizing signal HSYNC, thereby outputting addresses in the subordinate-scanning direction.

The outputs of the counters 801 and 802 each consist of four bits, and the color identification signal 117 consists of five bits. Thus, data consisting of a total of 13 bits is applied to the ROM 803 as an address. In other words, the arrangement is such that a pattern consisting of 16×16 dots can be generated with regard to 32 types of read colors.

The output from the pattern ROM 803 has a data length of eight bits, in which the MSB (the most significant bit) is used as the control signal (HIT signal 115) within the pattern synthesizing circuit 105, described later. The data is written in so that this MSB usually is "0" but always becomes "1" when a pattern is generated. It should be noted that the pattern ROM 803 may be substituted for by a memory that is capable of being rewritten, such as a RAM. If a RAM or the like is used, the capacity thereof and the bit assignment of the address are the same is in the case of the ROM.

[Pattern Synthesizing Circuit]

The construction of the pattern synthesizing circuit 105 will now be described.

Figure 13:
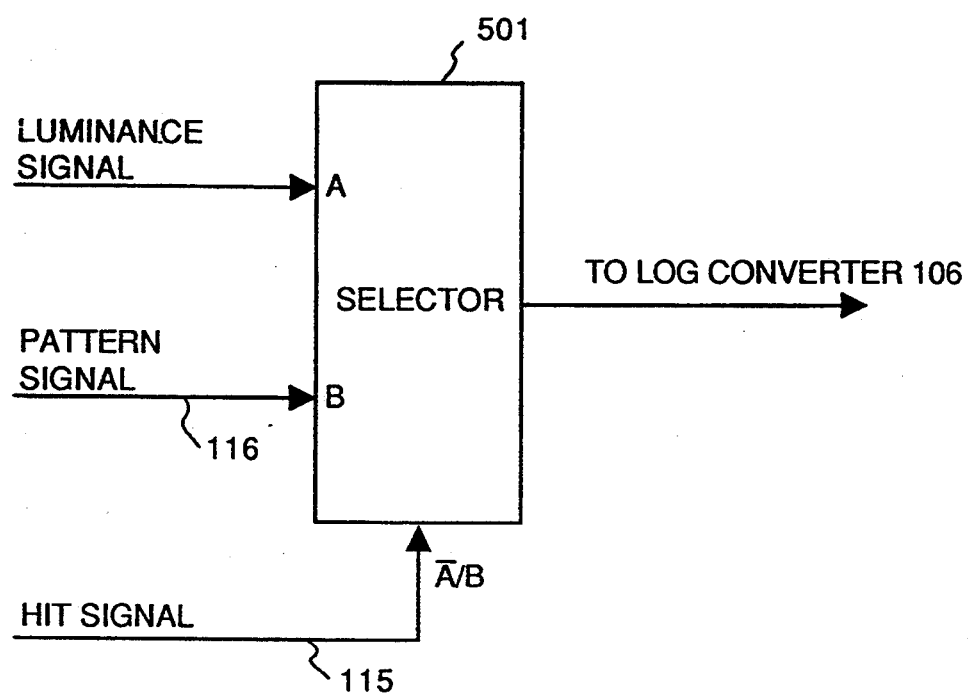
FIG. 13 is a block diagram showing the construction of a pattern synthesizing circuit in this embodiment.

FIG. 13 is a block diagram illustrating the construction of the pattern synthesizing circuit 105 according to this embodiment.

In FIG. 13, numeral 501 denotes a selector which selects, in accordance with the HIT signal 115 from the pattern generating circuit 108, the luminance signal sampled by the AE data sampling unit 104 or the pattern signal 116 generated by the pattern generating circuit 108. Since an area for which the HIT signal 115 is "1" is an area in which the image of the original is judged to be chromatic, the pattern signal 116 corresponding to the color is selected and output to the LOG converter 106. For an area in which the HIT signal 115 is "0", the luminance signal is output to the LOG converter 106 as is.

[LOG Converter]

The construction of the LOG converter 106 will be described next.

The LOG converter 106 is a look-up table comprising a ROM or a RAM. For the sake of simplicity, the LOG converter 106 is assumed to be a ROM in this embodiment. The CPU 110 selects a suitable LOG conversion table from the sampled AE data and performs a LOG conversion.

Figure 14A:
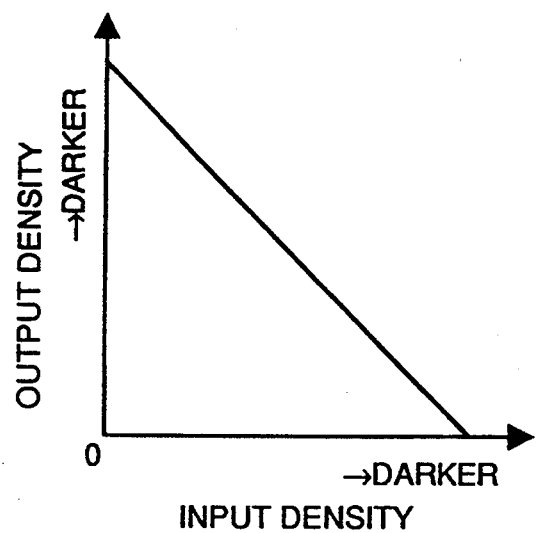
FIGS. 14A–14C are graphs showing specific examples of a LOG conversion characteristic in this embodiment.
Figure 14B:
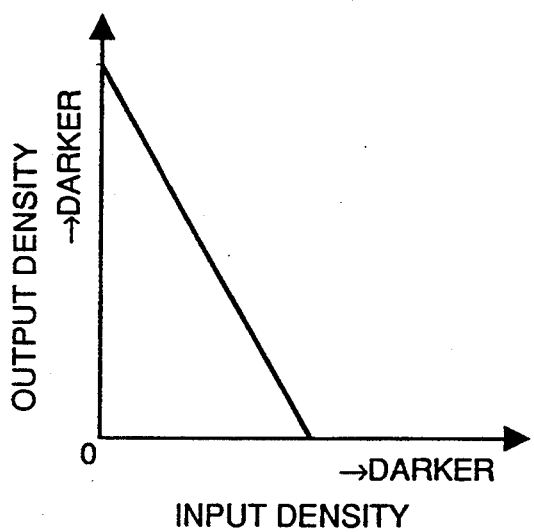
Figure 14C:
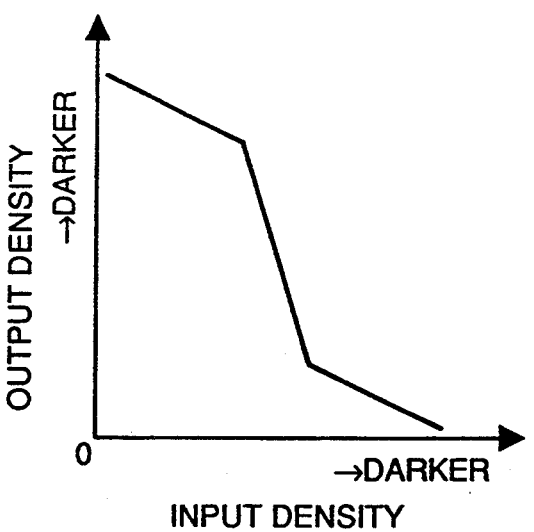

FIGS. 14A–14C are graphs showing specific examples of the LOG conversion characteristics in the LOG converter 106 according to this embodiment. In FIGS. 14A–14C, FIG. 14A represents a conversion characteristic in which there is a linear conversion characteristic between input density and output density. Further, and by way of example, if an original is judged to be one having characters or the like and it is desired to eliminate the fog on white background of the original when sampling the AE data, a LOG characteristic of the kind shown in FIG. 14B is selected. In other words, in a case where the input density is rather high (white), the output density is replaced by "0", namely white, to eliminate the fog. If a certain constant density level is concentrated within the original when sampling the AE data, the characteristic shown in FIG. 14C is selected to widen the dynamic range of a certain density level.

In accordance with the embodiment as described above, it is determined when performing a color-pattern conversion whether sampled luminance information lies within an area judged to have color. When the information does not lie within this area and AE is applied, the luminance distribution of the entire original is sampled and a color-pattern conversion is performed. When the luminance information of the original lies within an area judged to have color, the sampled luminance information for AE is not used, thereby making it possible to realize accurate AE.

<Second Embodiment>

As a second embodiment of the invention, AE in a case where a difference in color is expressed by a difference in monochromatic density will be described.

The basic concept of this embodiment is similar to that of the first embodiment described above. Precise AE is applied by discarding AE sampling data within an area in which a color-density conversion is performed. As for the circuitry of this arrangement, it will suffice to replace the pattern generating circuit 108 by a luminance generator circuit 721 (See FIG. 15) and write luminance data, which corresponds to each color, in the pattern ROM 803 instead of patterns corresponding to each of the colors.

<Third Embodiment>

A third embodiment of the invention will now be described.

With regard to AE in a case where a color-density conversion is made, the third embodiment is such that sampling of luminance information for carrying out AE is performed by sampling the luminance of the original as is with regard to an area in which a conversion of color density is not made, and sampling the luminance information of the image after conversion with regard to an area in which the conversion of color density is made, whereby the end result is that accurate AE is applied to the output image. Such a case will now be described. By way of example, in a case were density after conversion of color density is close to black, the entire output image becomes relatively blacker by a corresponding amount, whereby an effect is obtained in which AE is applied to the overall output image.

Figure 15:
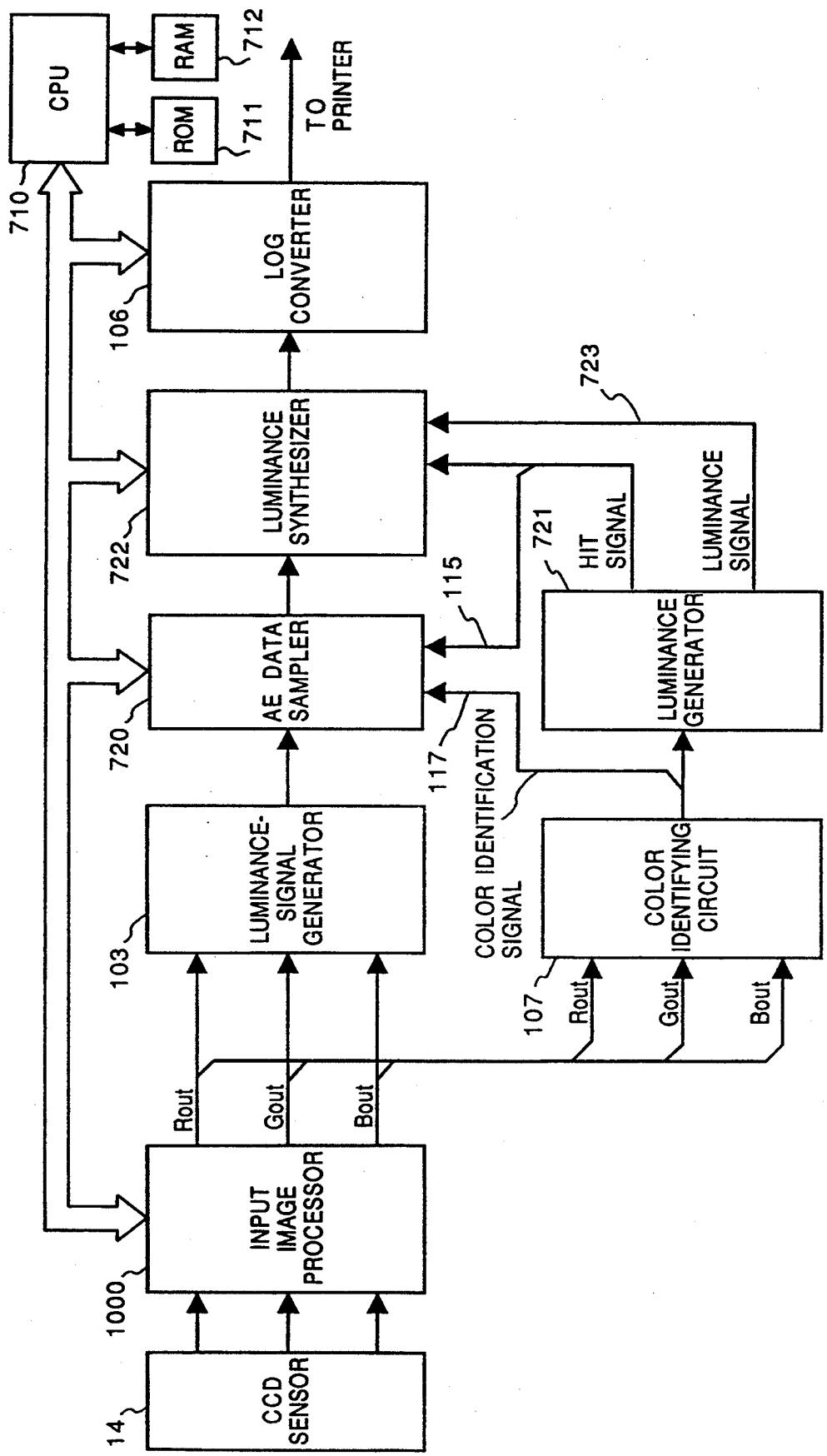
FIG. 15 is a is a block diagram illustrating the construction of an image processing circuit according to a second embodiment of the present invention.

FIG. 15 is a block diagram illustrating the construction of an image processing apparatus according to the third embodiment of the present invention. In FIG. 15, numeral 721 denotes a luminance generator circuit which, in a manner similar to that described in connection with the second embodiment, is so designed that luminance data corresponding to colors is written in a pattern ROM 803 instead of patterns. Numeral 722 designates a luminance synthesizer circuit which selects, in accordance with the HIT signal, a luminance signal indicative of the original and generated by the luminance-signal generating unit 103, or a luminance signal 723 in which a difference in color is expressed as a difference in luminance. This can be realized by replacing the pattern signal 116, which which is applied to the selector 501 in FIG. 13, by the luminance signal 723 from the luminance generating circuit 721.

Numeral 720 denotes an AE-data sampler unit which, unlike the AE-data sampler unit 104 described in the first embodiment, is provided as an input, the discrimination signal 117 indicating the type of color discriminated by the color discriminating circuit 107. This discrimination signal 117 is input to bits other than the bit of the HIT signal, which is the MSB. For example, if the RAM 603 has an eight-bit construction, bit 7 is the HIT signal, bits 5, 6 are for the discrimination signal 117, and bits 0–4 are for the luminance signal from the luminance-signal generating unit 103. Though the delay relationships among the HIT signal, color-category signal and luminance signal are not shown, all of the delay relationships are made to conform when this arrangement is actually realized.

The above-mentioned embodiment is such that when the entirety of an original has a background color such as light pink or the like, the background color also is replaced by a pattern so that the entire surface of a sheet that has been printed out takes on the form of a pattern image. As a result, the image is extremely difficult to see. An embodiment will now be described in which an output image converted into an excellent pattern can be obtained even if the original is of the above-mentioned kind.

Figure 16:
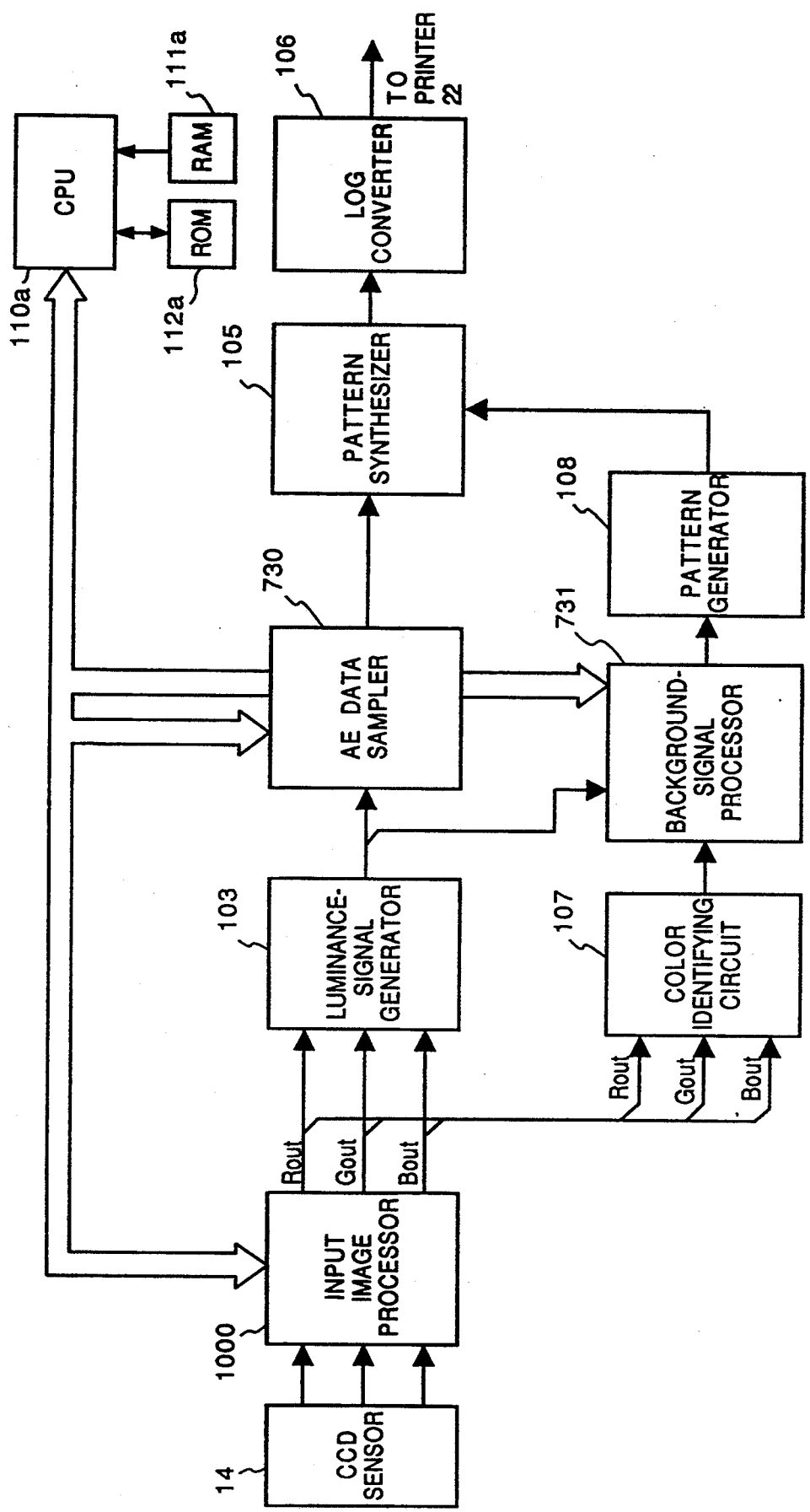
FIG. 16 is a block diagram showing the construction of an image processing circuit according to another embodiment.

FIG. 16 is a block diagram showing the construction of an image processor according to a fourth embodiment of the present invention.

When AE prescanning is performed, a CPU 110a in FIG. 16 causes an AE data sampler unit 730 to produce a histogram (see FIGS. 17A and 17B) having the density of the original using a RAM 101a. The basic circuit operation of the AE data sampling unit 730 is the same as in the first embodiment described above.

Figure 17A:
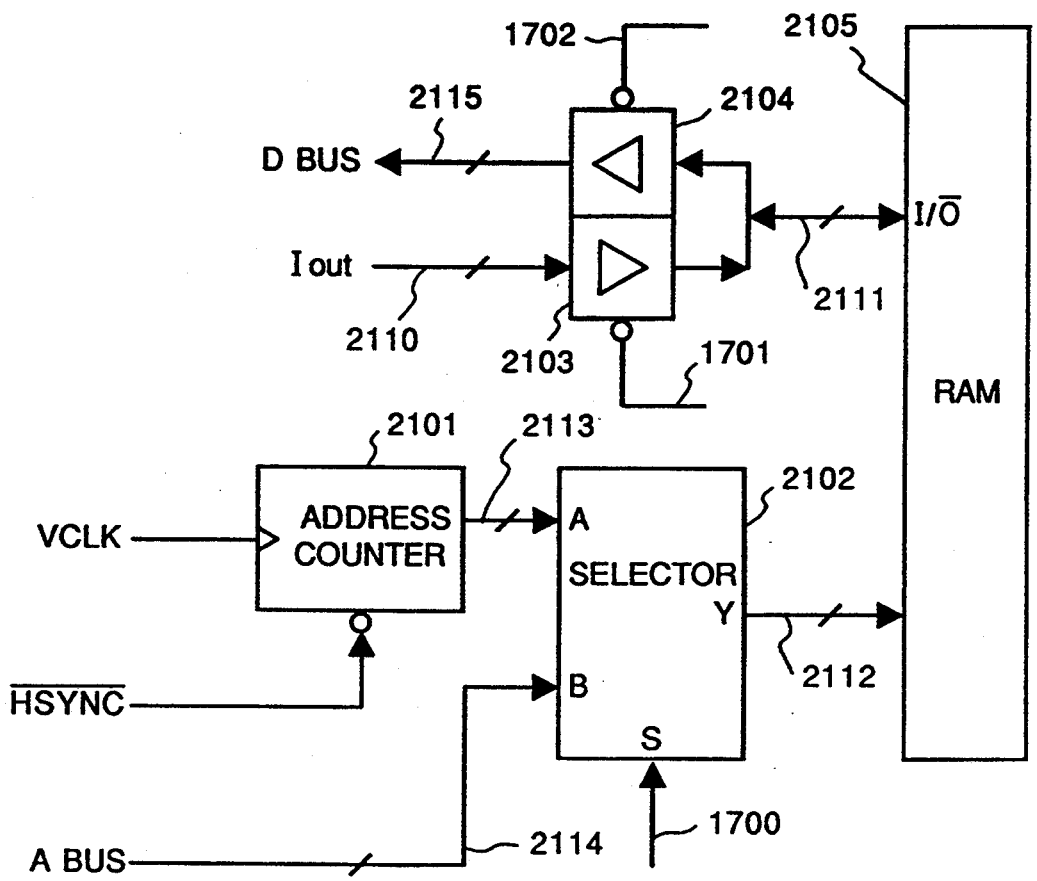
FIGS. 17A and 17B are block diagrams showing the construction of the AE data sampler unit shown in FIG. 16.
Figure 17B:
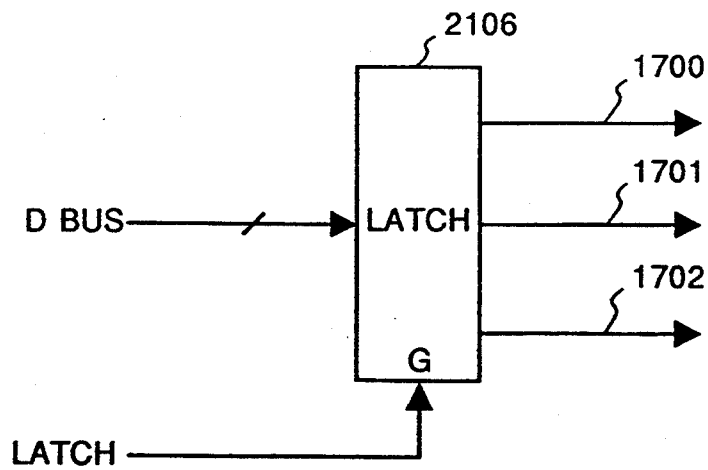

The AE data sampler unit 730 will be described with reference to FIGS. 17A and 17B.

An image signal $I_{out}$, which has been subjected to a shading correction and converted into a luminance signal by the input image processing section 1000, is sampled line by line by the AE data sampling unit 730, and the level of this signal is read by the CPU 110a, which creates a histogram. As a result, the level limits of the read image data are detected and an AE correction in which the color of the background level of the original is not identified is applied. The sampling of the image data is carried out by the circuits shown in FIGS. 17A and 17B.

It should be noted that the sampling of the image data in the above-described AE correction is performed by prescanning the image of the original before the actual operation for reading the original image. That is, a gate 2103 is opened by a signal 1701 and a gate 2104 is closed by a signal 1702 in order that one line of the image data $I_{out}$, which has been subjected to the shading correction and converted into the luminance signal $I_{out}$, may be stored in a RAM 2105. More specifically, the data line takes on the form 2110→2111. Meanwhile, a selection signal 1700 applied to a selector 2102 is produced in order that an output 2113 of an address counter 2101, which is initialized by an inverted HSYNC signal and clock VCLK, will be applied to an address input 2112 of the RAM 2105. As a result, one line of the luminance signal data is stored in the RAM 2105. (The foregoing mode of operation is referred to an image-data sampling mode.)

When an image is read in, the RAM 2105 is placed in a data read-out mode and one line of sampled image data is read in to the CPU 110a of FIG. 16 through a data bus (D-Bus) via the path composed of data line 2111→2115. At this time the image data read in the CPU 110a is not all of the pixel data of one line. Rather, one pixel every millimeter, i.e., every 16 pixels, for data of 293 pixels/line in the longitudinal direction of an A4 original, is read in the CPU 110a. Furthermore, in the subordinate scanning direction, the above-mentioned image-data sampling mode is executed at an interval of 1 mm, namely once every 16 lines, just as in the main scanning direction. For an original whose size is A4, the number of pixels of data sampled is as follows: 293 pixel/line×206 lines=60358 pixels.

At this time the gate 2103 is closed by the selection signal 1701 and the gate 2104 is opened by the selection signal 1702. In addition, the selector 2102 selects the B input of the address bus (A-Bus) of CPU 110a in accordance with the selection signal 1700 and an address is applied to the address input of the RAM 2105 via the path composed of address lines 2114→2112. Here the selection signals 1700–1702 of the selector gates for the present control operation are output from a latch circuit 2106 allocated as the I/O of the CPU 110a.

Figure 18:
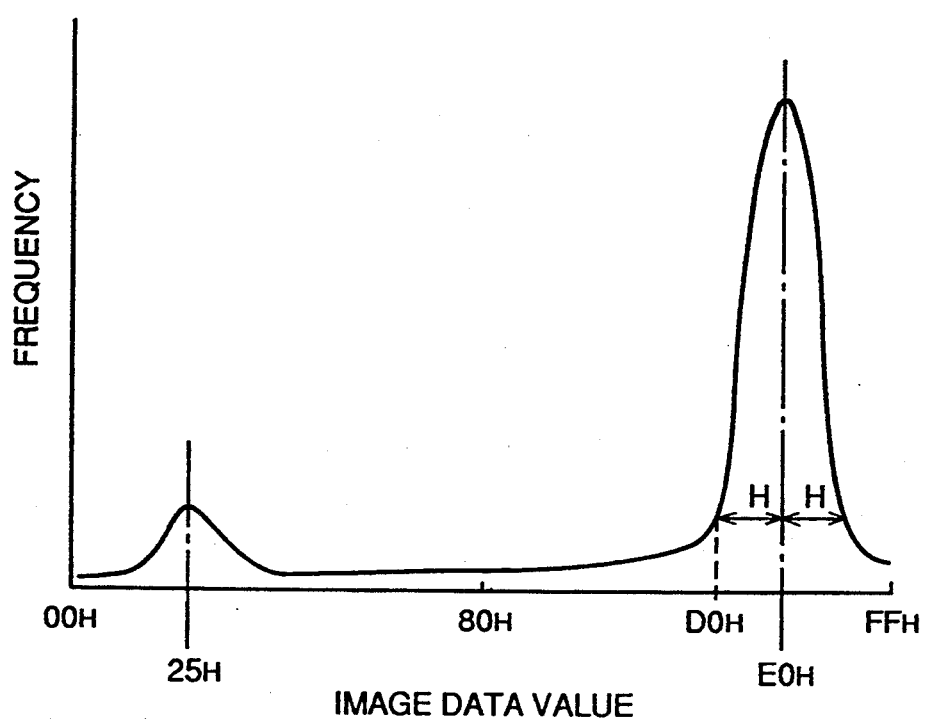
FIG. 18 is a graph showing an example of the luminance histogram of a character-document image which has a background color.

The data sampled in the case of an A4 original is processed by the CPU 110a and a histogram is produced in the manner described above. For example, in the case of an original such as a newspaper, in which the background is somewhat dark and characters or the like are included, a histogram of the kind shown in FIG. 18 is produced. More specifically, as shown in FIG. 18, a peak in the luminance of a background appears in the luminance-data value "E0H", and a peak in the luminance of a character portion appears in the luminance-data value "25H". Accordingly, if the color of the background is suppressed in order to inhibit the formation of a pattern, merely subjecting the luminance signal $I_{out}$ to a correction of the kind which makes the peak value "E0H" of the background become "FFH" causes the distribution of the histogram of the background to become a Gaussian-type distribution. As a result, it becomes impossible to effect complete elimination of the background. In consideration of the parameter 1 (H=10H) of the spread of the base of the histogram distribution of the background, a correction ② in FIG. 19) is applied such that "D0H" will become "FFH".

In this embodiment, the correction indicated at ② in FIG. 19 is added to the LOG table of the above-mentioned LOG converter 106. In FIG. 19, the characteristic ① is the usual; ② illustrates values of the table in which the image level "D0H" is converted to "FFH" (white); and ③ illustrates values of the table in which a dark image "B0H" of the background is converted to "FFH" to eliminate the background.

Figure 20:
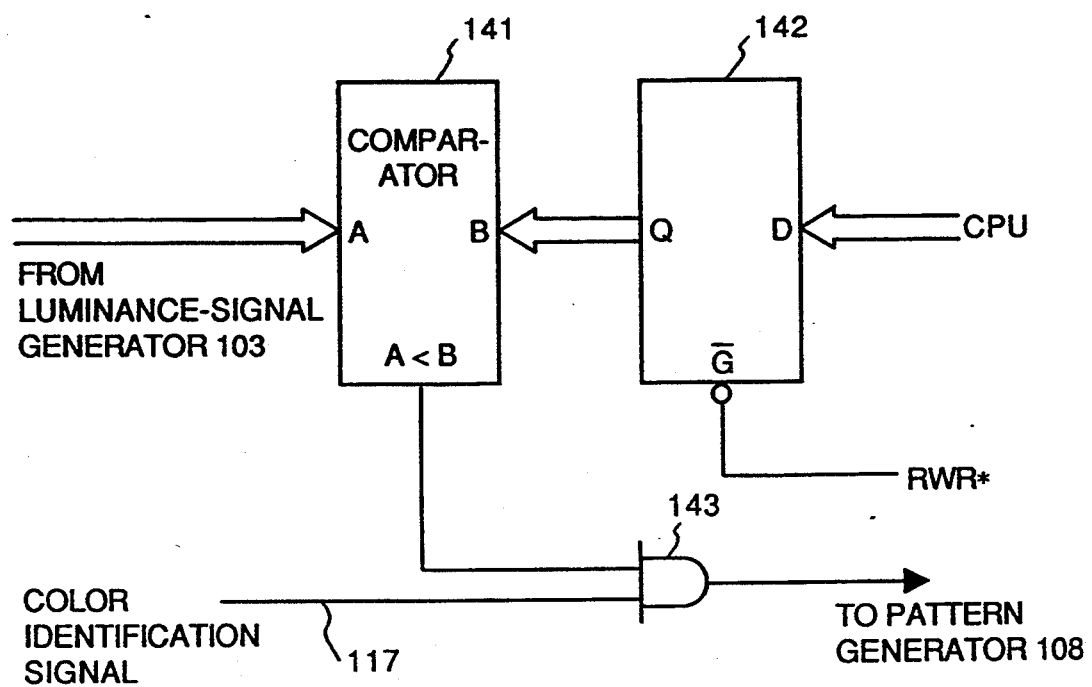
FIG. 20 is a block diagram showing the construction of the background signal processor shown in FIG. 16.

FIG. 20 is a block diagram showing the construction of the background-signal processor 731 of this embodiment. The processor is constituted by a comparator 141, a register 142 and an AND gate 143, as shown in FIG. 20. In operation, the CPU 101a sets the value "D0H" of the background level obtained by the aforementioned AE prescanning in the register 142 before the present scan. At the time of the present scan, the comparator 141 compares a video signal produced by the luminance signal generating unit 103 and the value "D0H" set in the register. If the video signal is smaller, i.e., darker, than the set value "D0H", a high-level signal is output to the AND gate 143. If the video signal is greater, i.e., brighter, than the set value "DOH", a low-level signal is output to the AND gate 143. In this way the color identification signal 117 output by the color identifying circuit 107 is turned on and off. The color identification signal 117 controlled in this manner is output to the pattern generating circuit 108, which is the next stage. Subsequent operation and control are the same as in the foregoing embodiments and need not be described again. In addition, this arrangement is applicable also to the above-described arrangement in which color is converted to luminance. Thus, AE is realized by adopting "DOH"-"FFH" as the luminance-signal area of the background and suppressing output of image data in this area.

Thus, in accordance with the fourth embodiment, the background color of the original is detected and a pattern is not formed with respect to this background color. As a result, solely an image of the necessary location is converted into a pattern to provide an image that is easy to view.

[Other Embodiment of the White Correcting Circuit of the Black-correcting/White Correcting Circuit]

FIG. 21 is a block diagram showing the construction of another embodiment of a white correcting circuit of the black-correcting/white-correcting circuit according to the present invention. Portions similar to those in the white correcting circuit of the foregoing embodiment shown in FIG. 7 are designated by like reference characters and need not be described again. Here a multiplier 190a is inserted between a multiplier 179a and $B_{out}$, and a signal from the data bus (D-Bus) is applied to the multiplier 190a via the register 191a. Control is performed in the same manner as previously explained, up to the output of $D_i \times FFH/W_i$ on signal line 1156a from the multiplier 179a. From this point onward, the CPU 110 sets data "1" in the register 191a in the ordinary mode so that this is output to the B input of multiplier 190a. In the pattern substituting mode, the CPU 101 sets a signal corresponding to "$P_1/FFH$", for example, in the register 191a so that this is output to the B input of the multiplier 190a. As a result, $D_i \times FFH/W_i$ is output at $B_{out}$ when the pattern substituting mode is not in effect and $D_i \times P_1/W_i$ is output at Bout when the pattern substituting mode is in effect. Here the design is such that the multiplier 190a will output "FFH" if the result of the arithmetic operation exceeds "FFH". It should be noted that the method of obtaining the correction coefficient $P_1$ and the data in the correction table of the LOG converter 106 are the same as in the foregoing embodiment.

Figure 22:
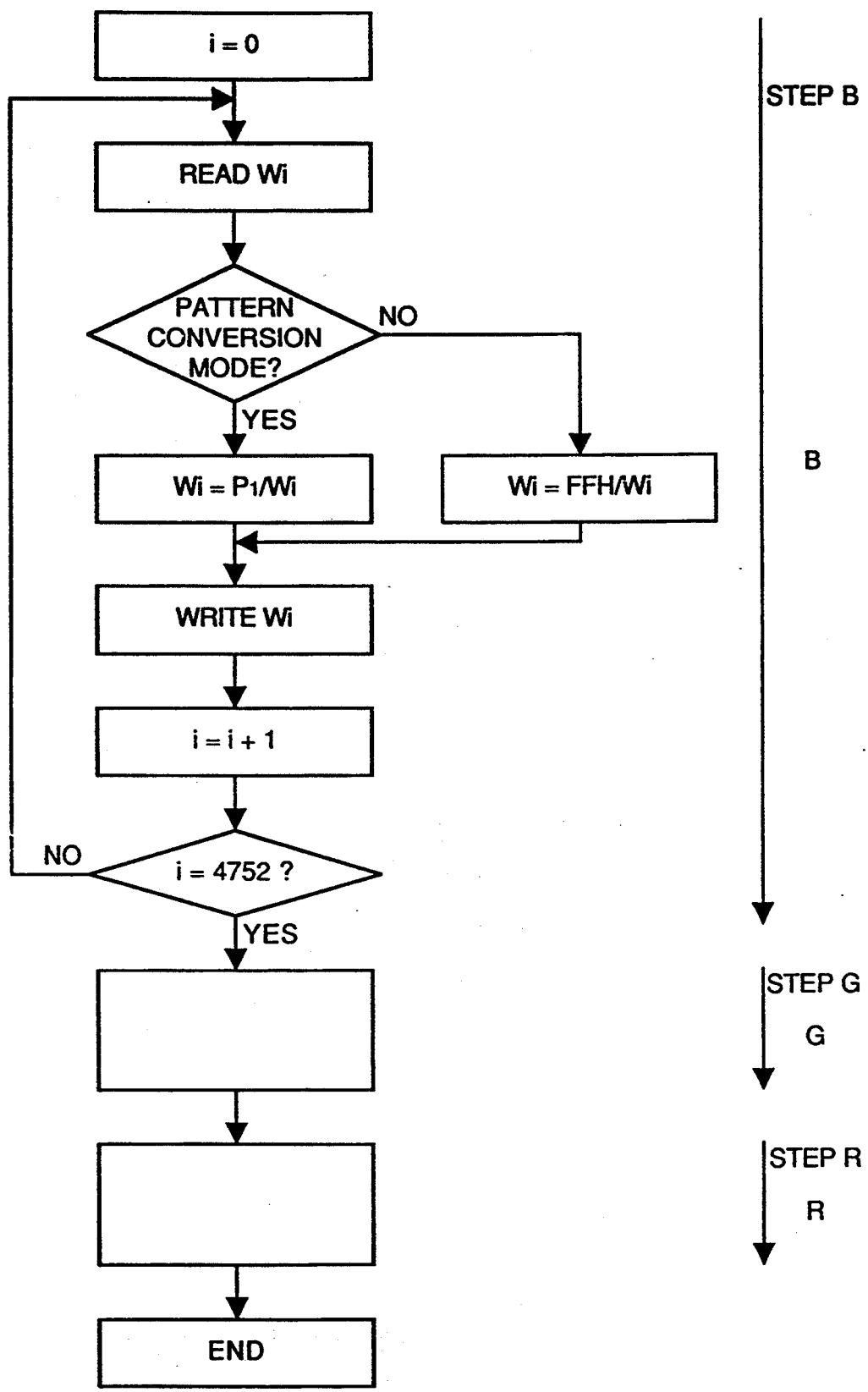
FIG. 22 is a flowchart for describing a white correction according to another embodiment.
Figure 23:
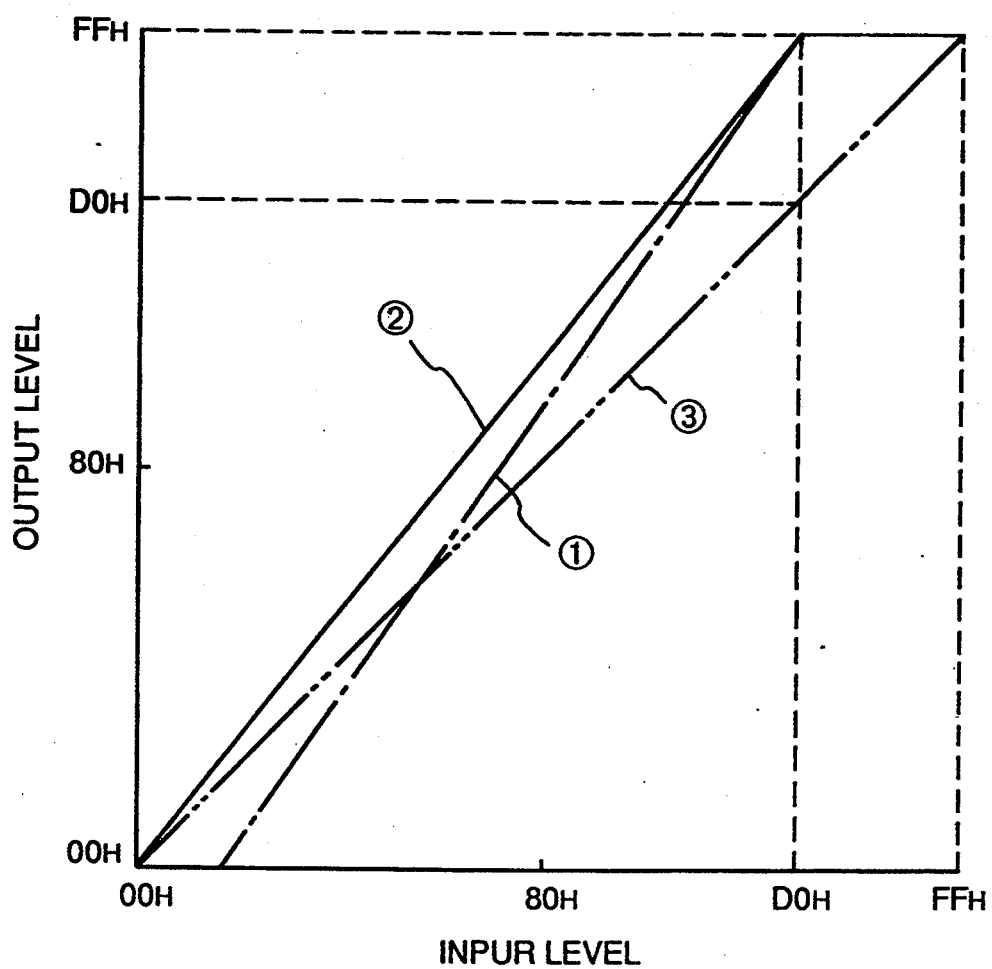
FIG. 23 is a graph showing an example of correction table data used by a LOG converter.

In another possible embodiment of the white correcting circuit, control is the same as above up to the point where the CPU 110 is capable of accessing the data in the RAM 178a. From this point onward, in the ordinary mode, the CPU 110 performs calculations successively in the manner $FFH/W_0$ with regard to the leading pixel $W_0$, $FFH/W_i$ with regard to the next pixel $W_i$, etc., and outputs the results. In the pattern substitutiing mode, if $P_1$ represents a correction coefficient greater than "FFH", the CPU 110 performs calculations successively in the manner $P_1/W_0$ with regard to the leading pixel $W_0$, $P_1/W_i$ with regard to $W_i$, etc., thereby performing a data substitution. This procedure is illustrated in the flowchart of FIG. 22.

It should be noted that the present invention may be applied to a system composed of a plurality of devices or to an apparatus comprising one device. It goes without saying that the present invention can be applied also to a case where the above-mentioned effects are attained by supplying a program to a system or apparatus.

In accordance with the present invention, as described above, the arrangement is such that when AE is applied, the luminance distribution of the entire original is sampled and is effectively converted into color patterns. With regard to areas in which the luminance signal of the original is not reflected in the output, it is possible to discard the AE sampling data. This makes it possible to realize accurate AE.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   color identifying means for identifying the color of an input image from an input color-image signal;
   luminance detecting means for detecting luminance information in the input color-image signal;
   image generating means for generating a predetermined pattern based upon the color identified by said color identifying means;
   measuring means for measuring the luminance distribution of the luminance signal from said luminance detecting means outside an area in which color is identified by said color identifying means; and
   setting means for setting the output density of the input color-image signal in conformity with the luminance distribution measured by said measuring means.

2. The apparatus according to claim 1, wherein said image generating means includes memory means for storing the predetermined pattern generated based upon the color identified.

3. An image processing apparatus comprising:
   color identifying means for identifying the color of an input image from an input color-image signal;
   luminance-information generating means for generating predetermined luminance information based upon the color identified by said color identifying means;
   measuring means for measuring the luminance distribution based upon the input color-image signal outside an area in which color is identified by said color identifying means; and
   setting means for setting the output density of the input color-image signal in conformity with the luminance distribution measured by said measuring means.

4. The apparatus according to claim 3, wherein said luminance-information generating means includes memory means in which predetermined luminance information corresponding to the color identified by said color identifying means is stored in advance.

5. An image processing apparatus for inputting a color image signal representing an image containing color, and outputting a pattern which corresponds to a color of the color image signal, comprising:
   correcting means having a first correction coefficient for a case where a pattern is not outputted with regard to the inputting color image signal, and a second correction coefficient for a case where a pattern is outputted with regard to the inputted color image signal, for applying a shading correction to the color image signal using the first and second correction coefficients;

measuring means for measuring the luminance distribution of the color image signal corrected by said first and second correcting means;

color identifying means for identifying a color of said color image signal based upon the color image signal corrected by said first and second correcting means;

image generating means for generating a predetermined pattern based upon the color identified by said color identifying means; and setting means for setting the output density of the color image signal in conformity with the luminance distribution measured by said measuring means.

6. The apparatus according to claim 5, wherein said measuring means measures the luminance distribution based upon a color image signal outside an area in which color is identified by said color identifying means.

7. An image processing apparatus for inputting a color image signal representing an image containing color, and outputting a pattern which corresponds to a color of the color image signal, comprising:

correcting means having a first correction coefficient for a case where a pattern is not outputted with regard to the inputting color image signal, and a second correction coefficient for a case where a pattern is outputted with regard to the inputted color image signal, for applying a shading correction to the color image signal using the first and second correction coefficients;

measuring means for measuring the luminance distribution of the color image signal corrected by said first and second correcting means;

color identifying means for identifying a color of said color image signal based upon the color image signal corrected by said first and second correcting means;

luminance information generating means for generating predetermined luminance information based upon the color identified by said color identifying means; and setting means for setting the output density of the color image signal in conformity with the luminance distribution measured by said measuring means.

8. An image processing apparatus comprising:

color identifying means for identifying the color of an input image from an input color-image signal;

luminance detecting means for detecting luminance information in the input color-image signal;

measuring means for measuring the distribution of the luminance information detected by said luminance detecting means;

image generating means for generating a predetermined pattern based upon the color identified by said color identifying means;

inhibiting mans for inhibiting generation of a pattern from said image generating means in conformity with the distribution measured by said measuring means; and pattern synthesizing means for outputting, in the form of a pattern from said image generating means, an area in which color is identified by said color identifying means, and outputting, in the form of the luminance information in the color image signal, areas other than the first-mentioned area.

9. An image processing method comprising the steps of:

identifying color of inputted color image based on an input color image signal;

detecting luminance information in the inputted color image signal;

generating predetermined pattern according to the determined color;

measuring the luminance distribution of the input color image signal except for the image area of which color is determined; and determining the density of color image signal to be outputted in conformity with the luminance distribution measured.

10. An image processing method for inputting a color image signal representing an image containing color, and outputting a pattern which corresponds to a color of the color image signal, comprising the steps of:

applying a shading correction to the color image signal using first and second correction coefficients, in which the first correction coefficient is for a case where a pattern is not outputted with regard to the inputting color image signal, and the second correction coefficient is for a case where a pattern is outputted with regard to the inputted color image signal;

measuring the luminance distribution of the corrected color image signal;

identifying a color of said color image signal based upon the corrected color image signal;

generating a predetermined pattern based upon the identified color; and setting the output density of the color image signal in conformity with the measured luminance distribution measured.

11. An image processing method comprising the step of:

identifying the color of an input image from an input color-image signal;

detecting a luminance signal in the input color-image signal;

measuring the distribution of the detected luminance signal;

generating a predetermined pattern based upon the identified color of the input color-image signal;

identifying, in conformity with the measured distribution of the luminance signal, whether an area in which color has been identified is outputted in the form of a pattern, and outputting areas other than the first-mentioned area in the form of luminance information in the input color-image signal.

12. An image processing apparatus comprising:

input means for inputting a color image signal which represents an image containing color;

image processing means for applying predetermined image processing to the color image signal from said input means;

measuring means for measuring the luminance distribution by collecting statistics of the frequency of occurrence of luminance data in the color image signal from said input means; and control means for controlling an area, in which image processing is performed by said image processing means, in accordance with the luminance distribution measured by said measuring means and for controlling so that the predetermined image processing is not applied to an area in the color image signal that has luminance data that has occurred frequently in the color image signal.

13. The apparatus according to claim 12, wherein said predetermined processing is processing for converting a color area in the color image to a predetermined pattern.

14. The apparatus according to claim 12, wherein said predetermined processing is processing for converting a color area in the color image to a predetermined luminance.

15. An image processing apparatus comprising:
color identifying means for identifying the color of an input image from an input color image signal;
image processing means for applying predetermined image processing to the color image signal based upon the color identified by said color identifying means;
measuring means for measuring the luminance distribution based upon the input color image signal outside an area in which color is identified by said color identifying means; and
setting means for setting the output density of the input color image signal in accordance with the luminance distribution measured by said measuring means.

16. An image processing method comprising the steps of:
identifying color of an input color image based on an input color image signal;
applying predetermined image processing to the input color image signal;
measuring the luminance distribution of the input color image signal except for an area of the input color image in which color is determined; and
determining the density of the input color image signal to be output in conformity with the luminance distribution measured.

17. An image processing apparatus comprising:
input means for inputting a color image signal which represents an image containing color;
image processing means for applying predetermined image processing to the color image signal from said input means;
discriminating means for discriminating a base color in the color image signal from said input means;
control means for controlling an area, in which image processing is performed by said image processing means, in accordance with the base color discriminated by said discriminating means.

18. The apparatus according to claim 17, wherein said control means performs control in such a manner that the predetermined image processing is not applied to an area in the color image signal in which color is discriminated as the base color by said discriminating means.

19. The apparatus according to claim 18, wherein said predetermined processing converts a color area in the color image signal into a predetermined pattern.

20. The apparatus according to claim 18, wherein said predetermined processing converts a color area in the color image signal into a predetermined luminance.

21. An image processing method comprising the steps of:
inputting a color image signal which represents an image containing color;
discriminating a base color in the color image signal;
controlling an area, in which the image processing is applied, in accordance with the discriminated base color.

22. The method according to claim 21, wherein said controlling step performs control in such a manner that a predetermined image processing is not applied to an area in the color image signal in which color is discriminated as the base color.

23. The method according to claim 22, wherein the predetermined image processing converts a color area in the color image signal into a predetermined pattern.

24. The method according to claim 22, wherein the predetermined image processing converts a color area in the color image signal into a predetermined luminance.

25. An image processing apparatus comprising:
color identifying means for identifying the color of an input image from an input color image signal;
image processing means for applying predetermined image processing to the color image signal from said input means based upon the color identified by said color identifying means;
measuring means for measuring the luminance distribution based upon the input color image signal outside an area in which color is identified by said color identifying means, and a signal processed by said image processing means; and
setting means for setting the output density of the input color image signal in accordance with the luminance distribution measured by said measuring means.

26. The apparatus according to claim 25, wherein said predetermined processing converts a color area in the color image signal into a predetermined pattern.

27. The apparatus according to claim 25, wherein said predetermined processing converts a color area in the color image signal into a predetermined luminance.

28. An image processing method comprising the steps of:
identifying color of an input color image based on an input color image signal;
applying predetermined image processing to the input color image signal;
measuring the luminance distribution of the input color image signal except for the image area in which color is determined; and
determining the density of a color image signal to be output in conformity with the measured luminance distribution.

29. The method according to claim 28, wherein the predetermined image processing converts a color area in the color image signal into a predetermined pattern.

30. The method according to claim 28, wherein the predetermined image processing converts a color area in the color image signal into a predetermined luminance.

31. An image processing apparatus comprising:
color identifying means for identifying a color of an input image from an input color-image signal;
detecting means for detecting a signal level in the input color-image signal;
image generating means for generating a predetermined pattern based upon the color identified by said color identifying means;
measuring means for measuring a distribution of the signal level from said detecting means outside an area in which color is identified by said color identifying means; and
setting means for setting an output level of the input color-image signal in conformity with the distribution measured by said measuring means.

32. The apparatus according to claim 31, wherein said image generating means includes memory means for storing the predetermined pattern generated based upon the color identified.

33. An image processing apparatus comprising:
color identifying means for identifying a color of an input image from an input color-image signal;
luminance-information generating means for generating predetermined luminance information based upon the color identified by said color identifying means;
measuring means for measuring a distribution of the signal level of the input color-image signal outside an area in which color is identified by said color identifying means; and
setting means for setting an output level of the input color-image signal in conformity with the distribution measured by said measuring means.

34. The apparatus according to claim 33, wherein said luminance-information generating means includes memory means in which predetermined luminance information corresponding to the color identified by said color identifying means is stored.

35. An image processing apparatus for inputting a color image signal representing an image containing color, and outputting a pattern which corresponds to a color of the color image signal, comprising:
correcting means having a first correction coefficient for a case where a pattern is not output with regard to the input color image signal, and a second correction coefficient for a case where a pattern is output with regard to the input color image signal, for applying a shading correction to the color image signal using the first and second correction coefficients;
measuring means for measuring a distribution of a signal level of the color image signal corrected by said first and second correcting means;
color identifying means for identifying a color of the color image signal based upon the color image signal corrected by said first and second correcting means;
image generating means for generating a predetermined pattern based upon the color identified by said color identifying means; and
setting means for setting an output level of the color image signal in conformity with the distribution measured by said measuring means.

36. The apparatus according to claim 35, wherein said measuring means measures the distribution based upon a color image signal outside an area in which color is identified by said color identifying means.

37. An image processing apparatus for inputting a color image signal representing an image containing color, and outputting a pattern which corresponds to a color of the color image signal, comprising:
correcting means having a first correction coefficient for a case where luminance information is not output with regard to the input color image signal, and a second correction coefficient for a case where luminance information is output with regard to the input color image signal, for applying a shading correction to the color image signal using the first and second correction coefficients;
measuring means for measuring a distribution of a signal level of the color image signal corrected by said correcting means;
color identifying means for identifying a color of the color image signal based upon the color image signal corrected by said correcting means;
luminance information generating means for generating predetermined luminance information based upon the color identified by said color identifying means; and
setting means for setting an output level of the color image signal in conformity with the distribution measured by said measuring means.

38. An image processing apparatus comprising:
color identifying means for identifying a color of an input image from an input color-image signal;
detecting means for detecting a signal level in the input color-image signal;
measuring means for measuring a distribution of the signal level detected by said detecting means;
image generating means for generating a predetermined pattern based upon the color identified by said color identifying means;
inhibiting means for inhibiting generation of the predetermined pattern by said image generating means in conformity with the distribution measured by said measuring means; and
pattern synthesizing means for outputting, in the form of the predetermined pattern from said image generating means, an area in which color is identified by said color identifying means, and outputting, in the form of information in the color image signal, areas other than the area in which color is identified.

39. An image processing method comprising the steps of:
identifying color of an input color image based on an input color image signal;
detecting a signal level in the input color image signal;
generating a predetermined pattern according to the color identified;
measuring a distribution of the signal level of the input color image signal except for an image area in which color is identified; and
determining a level of a color image signal to be output in conformity with the distribution measured.

40. An image processing method for inputting a color image signal representing an image containing color, and outputting a pattern which corresponds to a color of the color image signal, comprising the steps of:
applying a shading correction to the color image signal to generate a corrected color image signal by using first and second correction coefficients, with the first correction coefficient being for a case where a pattern is not output with regard to the color image signal, and the second correction coefficient being for a case where a pattern is output with regard to the color image signal;
measuring a distribution of a signal level of the corrected color image signal;
identifying a color of the color image signal based upon the corrected color image signal;
generating a predetermined pattern based upon the color identified; and
setting an output level of the color image signal in conformity with the distribution measured.

41. An image processing method comprising the steps of:

identifying a color of an input image from an input color-image signal;

detecting a signal level in the input color-image signal;

measuring a distribution of the detected signal level;

generating a predetermined pattern based upon the identified color of the input color-image signal;

identifying, in conformity with the measured distribution of the signal level, whether an area in which color has been identified is output in the form of the predetermined pattern, and outputting areas other than the area in which color has been identified, in a form having no pattern.

42. An image processing apparatus comprising:

input means for inputting a color image signal which represents an image containing color;

image processing means for applying predetermined image processing to the input color image signal;

measuring means for measuring a distribution of a signal level of the input color image signal by collecting statistics of the frequency of occurrence of each signal level in the input color image signal; and control means for controlling an area, in which the predetermined image processing is performed by said image processing means, in accordance with the distribution measured by said measuring means, and for controlling so that the predetermined image processing is not applied to an area in which the color image signal with a signal level having high frequency of occurrence is included.

43. An image processing apparatus comprising:

color identifying means for identifying a color of an input image from an input color image signal;

image processing means for applying predetermined image processing to the color image signal based upon the color identified by said color identifying means;

measuring means for measuring a distribution of a signal level of the input color image signal based upon the input color image signal outside an area in which color is identified by said color identifying means; and setting means for setting an output level of the input color image signal in accordance with the distribution measured by said measuring means.

44. An image processing method comprising the steps of:

identifying a color of an input color image based on an input color image signal;

applying predetermined image processing to the input color image signal;

measuring a distribution of signal level of the color image signal except for an area of the input color image in which color is identified; and determining a signal level of the input color image signal to be output in conformity with the distribution measured.

45. An image processing apparatus for inputting a color image signal representing an image containing color, and outputting a pattern which corresponds to a color of the color image signal, comprising:

correcting means having a first correction coefficient for a case where luminance information is not output with regard to the color image signal, and a second correction coefficient for a case where luminance information is output with regard to the color image signal, for applying a shading correction to the color image signal using the first and second correction coefficients;

measuring means for measuring a luminance distribution of the color image signal corrected by said correcting means;

color identifying means for identifying a color of the color image signal based upon the color image signal corrected by said correcting means;

luminance information generating means for generating predetermined luminance information based upon the color identified by said color identifying means; and setting means for setting an output density of the color image signal in conformity with the luminance distribution measured by said measuring means.

* * * * *

UNITED STATES PATENT AND TRADEMARK OFFICE
CERTIFICATE OF CORRECTION

PATENT NO. : 5,408,343
DATED : April 18, 1995
INVENTOR(S) : TAKASHI SUGIURA, ET AL.

It is certified that error appears in the above-identified patent and that said Letters Patent is hereby corrected as shown below:

ON TITLE PAGE

In [56] References Cited, under FOREIGN PATENT DOCUMENTS:
"63-59303  6/1981  Japan" should read
--63-59303  11/1988  Japan--.

IN THE DRAWINGS

Sheet 23 of 23, "INPUR" should read --INPUT--.

COLUMN 1

Line 32, "manner" should read --manner,--.

COLUMN 3

Line 14, "is a is a" should read --is a--.

COLUMN 4

Line 11, "fixer" should read --fixer 21.--.

COLUMN 6

Line 63, "78aassumes" should read --78a assumes--.
Line 64, "78ais" should read --78a is--.

COLUMN 8

Line 7, "them" should read --then--.

COLUMN 9

Line 20, ""1"" should read --"1",--.

UNITED STATES PATENT AND TRADEMARK OFFICE
CERTIFICATE OF CORRECTION

PATENT NO. : 5,408,343
DATED : April 18, 1995
INVENTOR(S) : TAKASHI SUGIURA, ET AL.

Page 2 of 2

It is certified that error appears in the above-identified patent and that said Letters Patent is hereby corrected as shown below:

<u>COLUMN 11</u>

Line 35, "is" should read --as--.

<u>COLUMN 13</u>

Line 1, "which which" should read --which--.

<u>COLUMN 14</u>

Line 47, "19)" should read --19--.

<u>COLUMN 17</u>

Line 59, "mans" should read --means--.

<u>COLUMN 18</u>

Line 36, "step" should read --steps--.

Signed and Sealed this

Eighteenth Day of July, 1995

Attest:

BRUCE LEHMAN

*Attesting Officer*   *Commissioner of Patents and Trademarks*